US010732731B2

(12) United States Patent
Odgers et al.

(10) Patent No.: US 10,732,731 B2
(45) Date of Patent: Aug. 4, 2020

(54) COMPUTER MOUSE

(71) Applicant: SWIFTPOINT LIMITED, Christchurch (NZ)

(72) Inventors: Grant Odgers, Little River (NZ); Blair Mackle, Christchurch (NZ); Ian Palmer, Christchurch (NZ)

(73) Assignee: Swiftpoint Limited, Christchurch (NZ)

( * ) Notice: Subject to any disclaimer, the term of this patent is extended or adjusted under 35 U.S.C. 154(b) by 0 days.

(21) Appl. No.: 16/312,751

(22) PCT Filed: Jun. 23, 2017

(86) PCT No.: PCT/NZ2017/050087
§ 371 (c)(1),
(2) Date: Dec. 21, 2018

(87) PCT Pub. No.: WO2017/222397
PCT Pub. Date: Dec. 28, 2017

(65) Prior Publication Data
US 2019/0220107 A1    Jul. 18, 2019

(30) Foreign Application Priority Data

Jun. 23, 2016   (NZ) .................................. 721516
May 31, 2017   (NZ) .................................. 732399

(51) Int. Cl.
*G06F 3/0354*   (2013.01)
*G06F 3/03*   (2006.01)
(Continued)

(52) U.S. Cl.
CPC ............ *G06F 3/03543* (2013.01); *G01L 5/22* (2013.01); *G06F 3/0304* (2013.01); *G06F 3/038* (2013.01); *G06F 3/0346* (2013.01)

(58) Field of Classification Search
CPC ....... G01L 5/22; G06F 3/0304; G06F 3/0346; G06F 3/03543; G06F 3/038
See application file for complete search history.

(56) References Cited

U.S. PATENT DOCUMENTS

| 7,821,494 B2 | 10/2010 | Tsai et al. | |
| 2002/0084986 A1* | 7/2002 | Armstrong | .......... G06F 3/03543 345/163 |

(Continued)

FOREIGN PATENT DOCUMENTS

| WO | 2006080858 | 3/2006 |
| WO | 2014009933 | 1/2014 |

OTHER PUBLICATIONS

Cougar Gaming, "Revenger", Website, Published Sep. 18, 2015, Downloaded Aug. 28, 2017, p. 1-4.

*Primary Examiner* — Dmitriy Bolotin
(74) *Attorney, Agent, or Firm* — David B. Tingey; Bryant J. Keller; Kirton McConkie

(57) ABSTRACT

A computer mouse (1) including a base with a lower surface (4) for sliding across a work surface (5), the lower surface (4) having a first base contact footprint (7*a*) with contact feet (6*a*-6*f*) for supporting the mouse (1) on the work surface (5). An upper (8) extends from the base (3) with a palm rest (9) extending from the rear (18) of the mouse upper (8). At least one trigger button (13*e*, 13*f*) is located forward of the palm-rest (9) and at least two primary buttons (13*a*, 13*b*) are located forward of the trigger button (13*e*, 13*f*). A recess (14) is formed underneath the trigger button (13*e*, 13*f*) and is at least partially formed by the underside of the trigger button (13*e*, 13*f*). An optical movement sensor (15) is included along with a communication system, for communicating with the computer (2).

19 Claims, 26 Drawing Sheets

(51) Int. Cl.
*G01L 5/22* (2006.01)
*G06F 3/038* (2013.01)
*G06F 3/0346* (2013.01)

(56) References Cited

U.S. PATENT DOCUMENTS

| | | | |
|---|---|---|---|
| 2008/0007527 A1* | 1/2008 | Sim | G06F 3/03543 |
| | | | 345/163 |
| 2009/0046064 A1* | 2/2009 | Manalo | G06F 3/03543 |
| | | | 345/164 |
| 2016/0077589 A1 | 3/2016 | Chataignier | |
| 2016/0328032 A1* | 11/2016 | Chen | G06F 3/03543 |

* cited by examiner

Figure 5
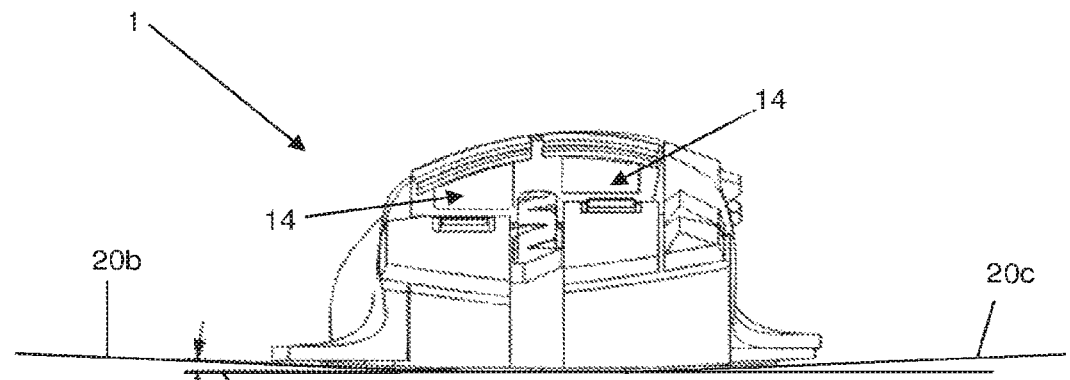
5a
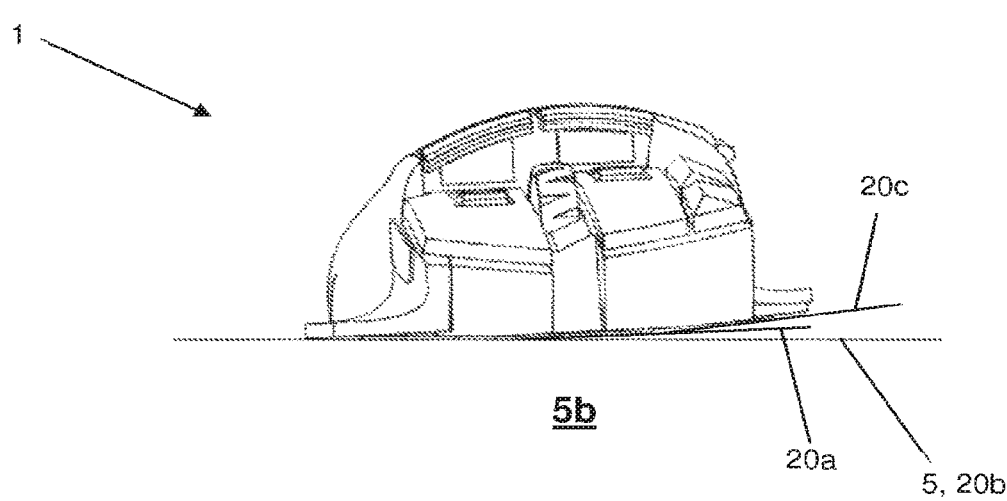
5b
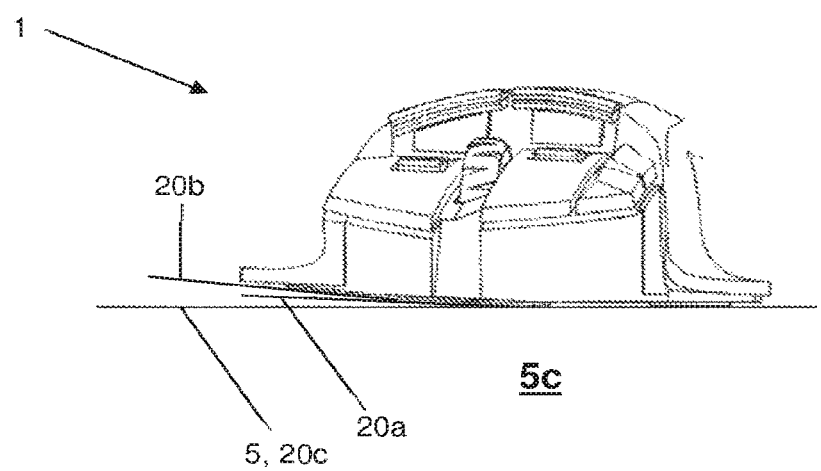
5c

"Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt. Neque porro ▓▓▓▓ est, qui dolorem ipsum quia dolor sit amet, consectetur, adipisci velit, sed quia non 15b)

"Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt. Neque porro quisquam I est, qui dolorem ipsum quia dolor sit amet, consectetur, adipisci velit, sed quia non 15a)

"Sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. Nemo enim ipsam voluptatem quia voluptas sit aspernatur aut odit aut fugit, sed quia consequuntur magni dolores eos qui ratione voluptatem sequi nesciunt. Neque porro quisquam I est, qui dolorem ipsum quia dolor sit amet, consectetur, adipisci velit, sed quia non

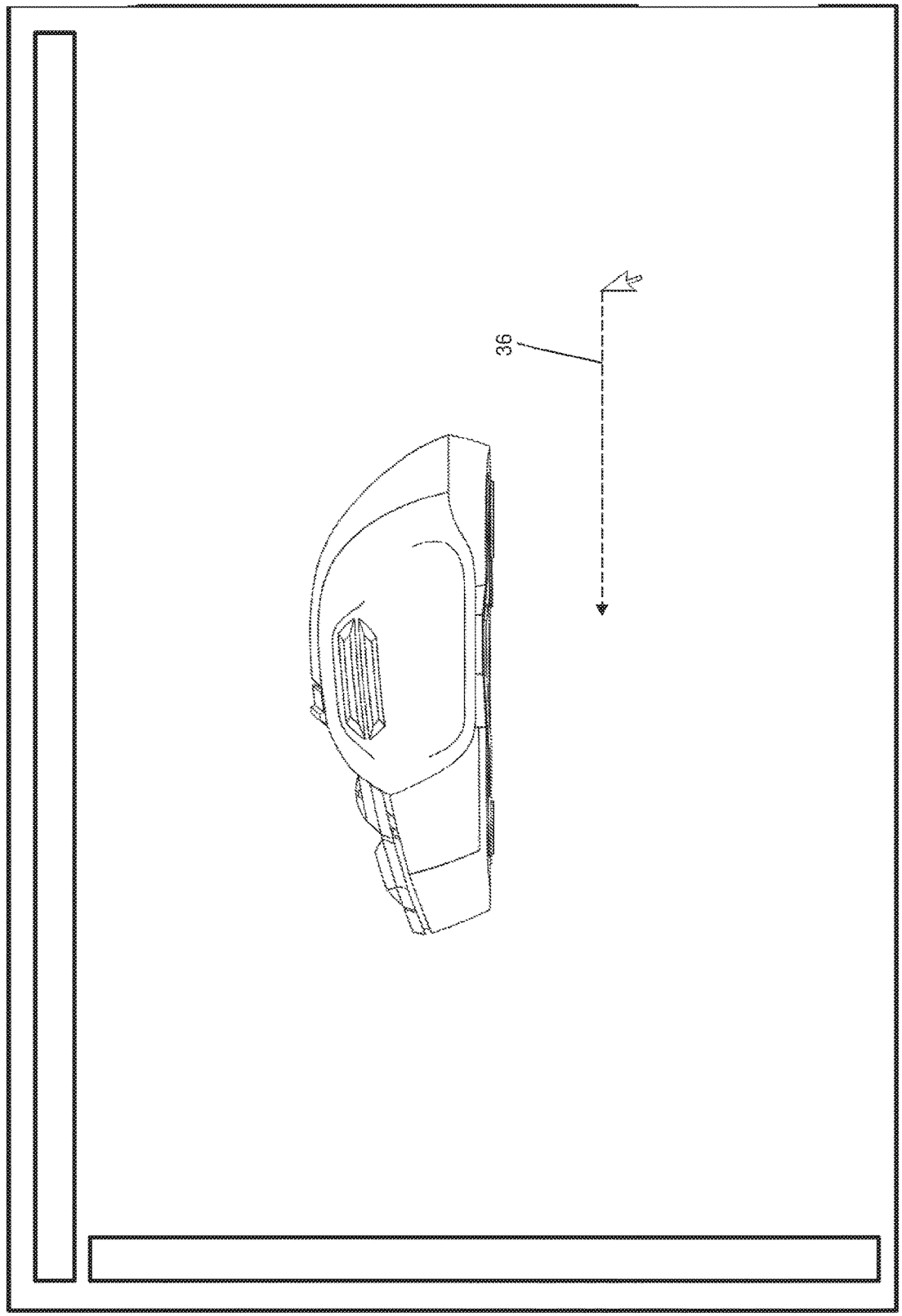

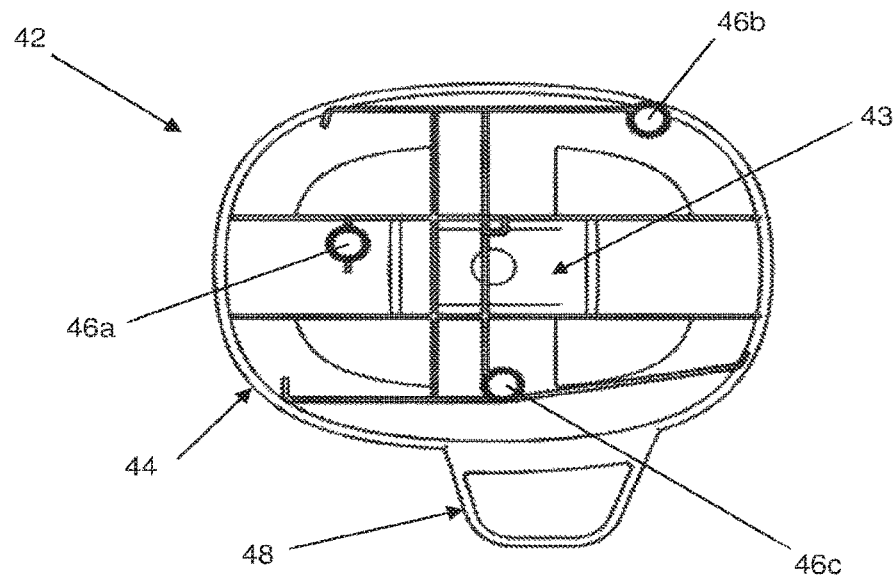
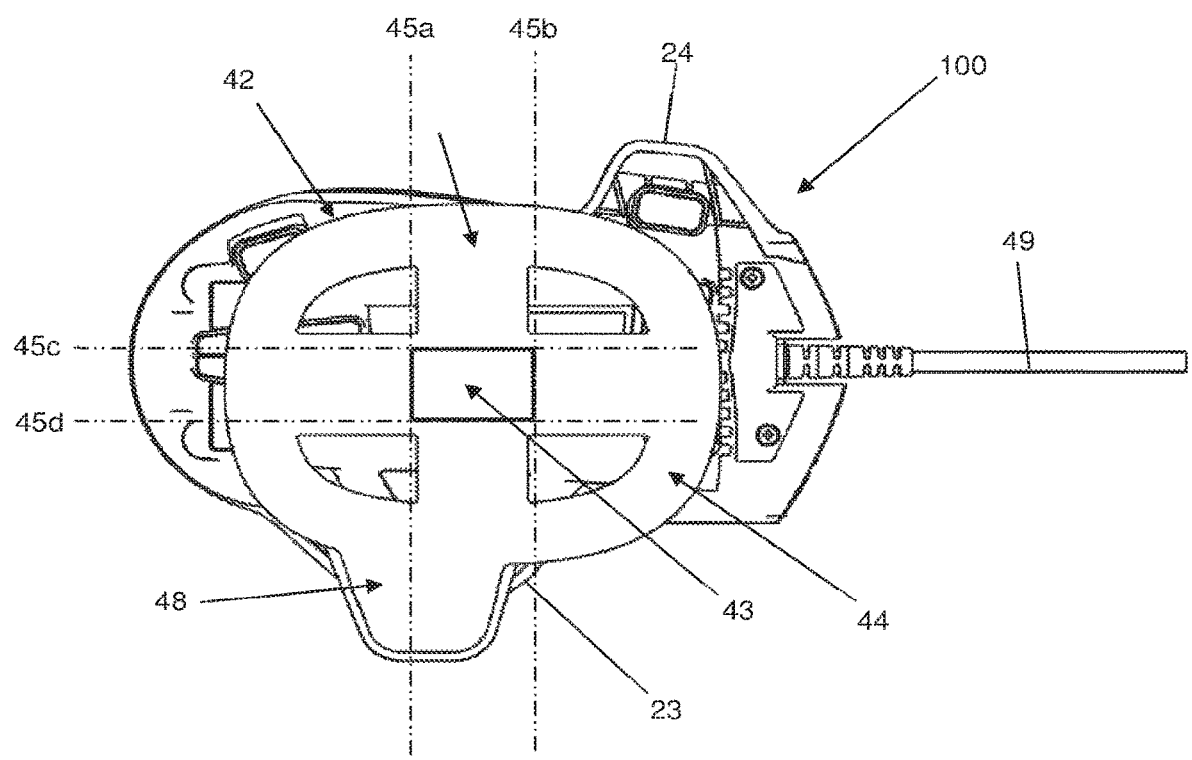

Figure 24

Tilt Left 1.2 Degrees > Do Nothing

Tilt Left 1.2 Return > Do Nothing

Tilt Left 25 Degrees > Do Nothing

Tilt Left 25 Return > Do Nothing

Tilt Right 1.2 Degrees > Vibrate 120%, .1 sec | OLED Flash "Config" 1s

Tilt Right 1.2 Return > Do Nothing

Tilt Right 25 Degrees > Do Nothing

> Left Trigger Pull > Alternate Next 5 | OLED DPI | OLED Profile | OLED Forces | OLED Angles | OLED Cube
>
> Left Trigger Pull Release > Do Nothing
>
>
> Scroll Wheel Pull Back > DPI + 100 | OLED Flash DPI 1s
>
> Scroll Wheel Push Forward > DPI + 100 | OLED Flash DPI 1s
>
>
> Rear Edge Press > Next Profile
>
> Rear Edge Release > Do Nothing
>
>
> Front Edge Press > Previous Profile
>
> Front Edge Release > Do Nothing Tilt Right 25 Return > Do Nothing Analog Left / Right -8 to 8 Degrees > Do Nothing

COMPUTER MOUSE

TECHNICAL FIELD

The present invention relates generally to a computer mouse and more specifically to an advanced computer mouse offering additional functionality over prior art mice.

BACKGROUND ART

Although the forerunner of the modern computer mouse was devised over 40 years ago by Doug Engelbart, the first major commercial implementation was delayed until 1983 with the advent of the Apple Macintosh™ computer. This was followed several years later by the widespread adoption of the Windows™ computer interface with which the computer mouse became an integral peripheral.

Despite this prolonged gestation period and widespread subsequent commercial utilisation, the essential function of the mouse has remained relatively unchanged since its inception.

This design stagnation is all the more striking given the rapid evolution of computer hardware and other peripheral devices in the same period. Many alternative devices have been investigated to provide an interface between the user and the computer and have met with varying degrees of success.

Touch interfaces are now widely used as the primary user interface for mobile computers such as mobile phones, tablets, car infotainment/navigation systems and other devices. Touch interfaces offer a more intuitive and easily adopted user control of a device than traditional controllers and are the first user interface most children will now encounter. Software for these touch-based operating systems is designed around the touch interface and typically offers a sub-optimal form of interaction when using a keyboard and mouse as the mouse and/or keyboard do not offer the same ease of use or myriad functionality of various touches, touch combinations, gestures and the like.

Nevertheless, the keyboard and mouse still serve as the primary input devices for the majority of desktop computers for users wanting precise control on large displays. One reason for the longevity of the mouse design stems from its success in translating hand to eye coordination, the need for virtually no training and an intuitive interface usable by virtually all age groups.

Prior art computer mice suffer a number of disadvantages including:
  Scrolling over large distances or moving the mouse pointer over large areas often requires a conventional mouse to be lifted off its support surface and moved in the opposite direction to avoid running out of space.
  Stability problems during activation of the mouse buttons increases the likelihood of disturbing the device position during the button 'clicking' action as the buttons are typically inclined steeply to match the contour of the hand lying with a 'palm-grip' on the mouse.
  Precision of movement is a compromise between being able to quickly move over large distances to moving with very precise small movements. This problem has been addressed in some prior art mice by providing a movement input to the computer that is proportional to the speed of movement in addition to position. However, precision control of small user interface elements can be very difficult, particularly for users with reduced dexterity. Moving small increments or selecting small portions of text or data is difficult.
  Moving between user interface elements typically requires a mouse movement to the element and then a click to select or a keyboard input. When there are many small user interface elements this can make selecting the desired element difficult. Alternatively, using the keyboard to cycle through the elements to the desired element is manually onerous as the user has to press a keyboard many times or hold down the key and carefully time the release.

The documents WO2014/009933 and WO/2006/080858 by Odgers et al. are hereby incorporated by reference in their entirety.

PCT published document WO2014/009933 by Odgers et al. describes a small computer mouse with the ability to provide various touch inputs to a touch-based operating system by tilting the mouse and performing gestures or other actions. The Odgers et al. mouse offers an advanced mouse, particularly suited for use with mobile computers or computers with an operating system accepting touch inputs. However, the Odgers et al. is limited in overall functionality compared with some mice optimised for gaming or productivity uses.

In gaming and productivity applications, it's desirable to have numerous buttons that can be configured to provide keyboard key presses or combinations/sequences of key presses i.e. macros. However, too many buttons will require additional space on the mouse and can reduce the ease in which the user can manipulate the mouse. There is therefore a balance to be made between the number and position of independent buttons and the space available on the mouse. Computer mice are also typically limited to binary (i.e. press/release) buttons, a rotary scroll-wheel and an optical or similar sensor for tracking XY movement over a desk or other work surface. Some computer mice use gyroscopes and/or accelerometers as an alternative movement sensor system to the typical optical sensor, examples of such devices are described in U.S. Pat. No. 7,821,494B2 by Tsai et al or the Gyration® air mouse disclosed in U.S. Pat. No. 5,825,350A by Case et al. and are commonly known as an 'air mouse'.

It would be advantageous to provide a mouse with advanced functionality.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

A "computer mouse" or "mouse" is herein defined as a device used to provide input to a computer to indicate movement of the device and/or an on-screen Graphical User Interface (GUI) element, e.g. an icon, pointer or mouse cursor. Computer mice may be defined as a subset of a larger group of computer controllers including mice, styluses, game controllers, trackballs, joysticks, remote controls, track-pads or the like.

A "computer" as referred to herein should be understood to include any computing device with a computer processor e.g. a desktop, laptop, netbook, tablet, phone, media player, network server, mainframe, navigation device, appliance, vehicle operating system or the like.

As used herein, a "work surface" is to be interpreted broadly and not in a restricted sense and includes but is not restricted to, a desk or table top, a surface of a computing device including the keyboard or screen, a person, or any other convenient surface.

It will be readily understood that there are multiple possible frames of reference for a mouse moving relative to a work surface, generating on-screen pointer movements or user interface element movements.

Thus, for the sake of clarity and comprehension, the mouse position, orientation, and movements are herein described with a frame of reference in which:

two mutually orthogonal axes; the $X_{WS}$ and $Y_{WS}$ axis, define a plane including a work surface, upon which the mouse is operated by a user's hand, the $X_{WS}$ and $Y_{WS}$ axes being respectively orientated anteriorly and laterally to the user;

A third work surface axis (the $Z_{WS}$ axis) is orientated mutually orthogonal to both the $X_{WS}$ and $Y_{WS}$ axes;

$X_{WS}$ and $Y_{WS}$ axes work surface movements by the mouse generate corresponding $X_S$ and $Y_S$ axis on-screen pointer movements, The mouse has a lateral axis $X_M$ and longitudinal axis $Y_M$ correlate to the on-screen $X_S$ and $Y_S$ axes respectively;

A third mouse axis (the $Z_M$ axis) is orientated mutually orthogonal to both the $X_M$ and $Y_M$ axes.

wherein:

The "rear" of the mouse is the portion closest to the user's wrist;

The "forward" part of the mouse is closest to the user's fingertips at the opposing side of the mouse to the "rear";

The $Y_M$ axis extends in a longitudinal direction between the "front" and "rear" of the mouse;

The mouse $Z_M$ axis is orientated vertically, perpendicular to a horizontal work surface when the mouse is positioned with a lower portion resting on the work surface;

The use of "longitudinal" and "lateral" herein should not be interpreted to explicitly or implicitly state that the mouse is 'longer' in the longitudinal direction.

A "pitch" of the mouse should be interpreted as including a rotation of the mouse about the $X_M$ axis.

A "yaw" of the mouse should be interpreted as including a rotation of the mouse about the $Z_M$ axis.

A "roll" of the mouse should be interpreted as including a rotation of the mouse about the $Y_M$ axis.

A "translation" should be interpreted as a movement, or component of movement, of the mouse along the $X_{WS}$, $Y_{WS}$ and/or $Z_{WS}$ axes.

A "slide" or "sliding" of the mouse should be interpreted as a translation movement of the mouse relative to the work surface, regardless of the mouse orientation.

A "tilt" should be interpreted as including a rotation of the mouse with respect to an axis with $X_M$ and/or $Y_M$ components.

Any axis may thus be defined by its respective X, Y, Z components from an origin.

Hereinafter reference to the computer mouse orientation will be made with respect to the work surface longitudinal ($Y_{WS}$), lateral ($X_{WS}$) and vertical ($Z_{WS}$) coordinate system. References to parts of the mouse itself will be made with references to longitudinal ($Y_M$), lateral ($X_M$) and vertical ($Z_M$) coordinate system with a user's hand extending forward to the computer mouse along the $Y_M$ dimension and wrist rotation generally about the $Y_M$ axis.

It should be understood that the $X_M$, $Y_M$, $Z_M$ need not be axes passing through the center of the mouse, e.g. a $Y_M$ axis may be any longitudinal axis passing through a portion of the mouse.

It should be understood that the aforementioned referenced system is not in any way binding and is purely illustrative for the purposes of explanation. The invention is not restricted to use with any particular working surface, screens, or orientations.

The term "contact sensor" as used herein refers to any sensor capable of detecting contact and/or pressure and includes by way of example depressible buttons as well as sensors capable of detecting changes in magnetism, conductivity, temperature, pressure, capacitance and/or resistance.

As used herein, the term "button" should be understood to refer to not only depressible switches but also multi-directional toggles, lever switches, triggers, pressure sensors, linear force transducers, torsion sensors or the like.

As used herein, the term "touch event" includes, but is not limited to, actual and virtual, simulated, emulated or translated touch actions on a touch-screen or touch-enabled operating system capable of processing touch events and includes; a touch, tap, long-tap, swipe, flick, scroll, pan and zoom.

"Fingertip engagement" as referred to herein with respect to thumb and fingertip engagement surfaces is used to denote a fingertip contact capable of moving and/or controlling the device and/or operating a contact sensor.

As used herein the term "contact foot" refers to the portions of a mouse that contact the work surface and support the mouse during use and may refer to integral parts of the mouse lower surface or may include attachments to the mouse.

Reference herein will be made to a two-dimensional area provided with vertical and horizontal dimensions with respect to a display screen in a typical upright orientation. This reference is to aid clarity and understanding only and should not be seen to be limiting as it will be appreciated the display screen may be orientated in a horizontal plane. Similarly, reference herein may be made to the computer mouse moving in a '$Y_{WS}$' direction and an orthogonal '$X_{WS}$' direction respectively correlating to the vertical and horizontal dimensions $Y_S$ and $X_S$ on the display screen. It should be appreciated that the $X_{WS}$, $Y_{WS}$ references and the $Y_S$ and $X_S$ references may be used interchangeably depending on the orientation of the display screen.

According to a preferred aspect, the present invention includes a computer mouse for use with a computer, the computer mouse including:
- a base with a lower surface configured for sliding across a work surface, the lower surface having a first base contact footprint for supporting the mouse on the work surface, the first base contact footprint including one or more contact feet lying in a first base contact plane, the mouse being in a first orientation when the first base contact plane is parallel to the work surface;
- an upper body, extending from the base;
- at least one contact sensor located on the upper body, the contact sensor activated by a contact or force applied in a direction at least partially toward the first base contact plane;
- a movement sensor system, capable of detecting mouse movement relative to the work surface;
- a communication system, for communicating with the computer by transmitting to, and receiving signals from, the computer.

Preferably, the movement sensor system includes an optical movement sensor and generates a movement data signal capable of being processed by the computer to determine mouse movement on the $X_{WS}$ and $Y_{WS}$ axes.

The forward buttons may include the primary buttons of the mouse, i.e. the almost universally recognised left-click' and 'right-click' buttons. A user clicking the primary buttons on many prior art mice may inadvertently move the mouse when clicking as the buttons are typically inclined downward from the palm rest portion (if present) and thus the force applied perpendicular to the surface of the primary buttons is non-vertical. However, making the primary buttons 'flat' introduces problems in shaping the palm rest and upper body which need to be shaped to fit the user's palm for ergonomic purposes.

In prior art mice there is thus a compromise made between:
- minimising the angle of inclination of the primary buttons and
- optimising the size and shape of the palm rest and mouse upper.

Prior art mice typically have an upper contour extending continuously forward from the rear of the mouse to the front primary buttons. This matches the profile of the human hand and offers an optimal ergonomic fit for the palm. However, the forward buttons are often inclined to match the finger inclination which can result in the aforementioned destabilizing of the mouse when clicking.

Thus, in one preferred embodiment the upper body includes
- a palm rest extending from the rear of the mouse upper,
- at least one contact sensor (hereinafter trigger button) forward of the palm-rest and at least two contact sensors (hereinafter primary buttons) forward of the at least one trigger button,
- a recess formed;
  - underneath the at least one trigger button and
  - at least partially, by the underside of the trigger button.

Preferably, the recess is located below a virtual reference line drawn from the forward-most portion of the palm rest and the forward buttons, the trigger button having at least a portion extending above the virtual reference line.

Preferably, the virtual reference line is drawn from the forward-most portion of the palm rest and forward-most portions of the primary buttons.

Preferably, the virtual reference line is drawn from the forward-most portion of the palm rest to a scroll wheel.

Preferably, the at least one trigger button provides a first input signal to the computer when the button is moved in a direction with a positive $Z_M$ component away from the lower surface.

Preferably, the at least one trigger button is a bidirectional button, wherein the communication system provides a:
- first input signal to the computer when the bi-directional button is moved in a first direction, and
- second input signal to the computer when the bi-directional button is moved in a second direction, wherein both the first and second directions have a $Z_M$ component.

Preferably the at least one trigger button extends forward from a forward edge of the palm -rest.

In one embodiment at least a portion of the upper body is shaped with an upper surface having a contour extending longitudinally forward from the mouse rear through a step, discontinuity, drop, point of inflection or other vertical height change (with respect to $Z_m$ axis) to the forward portion of the mouse.

Preferably, the upper body includes a vertical step between a forward-most portion of the palm rest and the forward buttons. Preferably a void is provided below a line drawn from the forward-most portion of the palm rest and a forward portion of the forward buttons.

Preferably the palm rest includes at least one trigger button at the forward-most portion, the void provided below a line drawn from the trigger button and the forward buttons.

Preferably, the at least one trigger button and at least one primary button are both operable by a single finger, the at least one trigger button by pressing a proximal phalange thereon while the primary button is operable by a fingertip of the same finger. A user may thus press either or both buttons without having to curl their finger or move it laterally.

Preferably the at least one trigger button includes an interchangeable cap. Users have different hand sizes and finger lengths and so it can be useful to provide different sized interchangeable caps so that the user can configure the trigger button to be operable without having to take their fingertips off the primary button.

Preferably the mode sensor includes at least one orientation sensor, selected from the group including: gyroscope, angular rate sensor, angular velocity sensor, magnetometer or equivalent sensor capable of detecting and/or measuring pitch and/or roll of the mouse.

In one embodiment the mode sensor may include at least one proximity sensor, capacitive or resistive touch sensor, mechanical button, force transducer, conductivity sensor, optical sensor, magnetic sensor or any iteration, combination or permutation thereof.

Preferably the mouse includes a translation sensor for measuring the translation of the mouse. The translation sensor may include at least one accelerometer or equivalent device capable of detecting and/or measuring the acceleration (or the instantaneous mouse positions and thereby calculating the acceleration) of the mouse in one or more directions.

Preferably the mode sensor includes both a translation sensor and orientation sensor.

Preferably, the software controlling the focal length controller of the optical sensor can be programmed to alter the optical sensor's focal length.

Preferably, in the second mode the focal length of the optical sensor is increased, to maintain focus even if the separation from the work surface is increased.

Preferably, the internal mouse circuitry is programmed to dynamically alter the focal length of the optical sensor in relation to the degree of inclination detected by the orientation sensor.

The first base contact footprint may include surfaces, projections or combination of surfaces/projections for (preferably stable) contact with a work surface to support the computer mouse in an 'upright' orientation.

The base and upper may be formed as one continuous component or formed from separate connectable components.

Preferably the mouse is configured to provide three-dimensional movement data, the mouse including at least one orientation sensor capable of detecting the orientation of the computer mouse and outputting data indicative of the orientation, the communication system transmitting a data signal to the computer indicating the orientation of the computer mouse, the orientation sensor providing movement data indicative of movement of the mouse in at least a third dimension, the third dimension including rotation about an axis.

Preferably the mouse is configured to provide at least eight-dimensional movement data, including three axes of acceleration, three axes of rotation and two axes of translation, the orientation sensor providing the data corresponding to the three axes of rotation.

The mouse preferably includes a 3-axis gyroscope, a 3-axis accelerometer and the optical sensor, thereby being able to provide eight-dimensional movement data. The computer may be configured to use the movement data from each dimension individually or in combination to provide commands to computer applications thus greatly increasing the available inputs to the computer in comparison to prior art computer mice.

Preferably, the at least one orientation sensor is a mode sensor, the mouse operating in a first mode when the orientation sensor data indicates the mouse is in a first orientation and a second mode when the orientation sensor data indicates the mouse is in a second orientation, the computer configured to provide different commands in the first and second modes using the optical sensor data.

Preferably, the at least one contact foot is configured to act as a pivot point, fulcrum or edge (hereinafter referred to as a 'pivot axis') about which the mouse may rotate, wherein the position of the contact foot is laterally adjustable to adjust the position of the pivot axis relative to a central longitudinal $Y_{MC}$ axis.

Preferably, the base contact footprint includes multiple spaced-apart contact feet, at least two of the feet configured to act as the pivot axis.

Preferably, the mouse includes two pivot axes, a pivot axis provided on each side of the central longitudinal $Y_{MC}$ axis.

Preferably, the at least one pivot axis is divergent from the central longitudinal ($Y_{MC}$) axis.

Preferably, at least two such pivot axes are provided, mutually divergent and extending forward from the rear of the mouse on opposing sides of the longitudinal $Y_{MC}$ axis of the mouse.

Preferably, the mouse includes a second base contact footprint, each base contact footprint including at least one corresponding contact foot, forming respective base contact planes and including a common pivot axis at the boundary between the first and second base contact footprints.

Preferably, a third base contact footprint is formed on an opposing side of the central longitudinal $Y_{MC}$ axis to the second base contact footprint.

Preferably, the first base contact footprint includes at least two adjustable portions, laterally adjustable to increase the separation of the contact feet in the first base contact footprint.

Preferably, the adjustable portions (hereinafter referred to as linked feet assemblies) each include one or more of the contact feet and preferably also include at least one lateral foot.

Preferably, the linked feet assemblies are preferably locatable, or positionable on the mouse in a plurality of orientations or locations at differing lateral separation to the longitudinal $Y_M$ axis.

Preferably, at least one linked feet assembly is magnetically coupled to the mouse.

Preferably, the first base contact footprint is reconfigurable to alter the angle of divergence between the two pivot axes.

Preferably, the first base contact footprint is reconfigurable to increase the lateral separation of a pivot axis to the longitudinal $Y_M$ axis.

Preferably, the computer is configured to provide at least one command to an application when the orientation sensor data relating to at least one axis passes at least one predetermined threshold value.

Preferably, the at least one command includes a press of a button or keyboard key when the orientation sensor data relating to at least one axis passes the threshold value and a release of the same button or key when the orientation sensor data subsequently passes the threshold value.

Preferably, the at least one command includes a press of a button or keyboard key when the orientation sensor data relating to at least one axis passes the threshold value and a second press of the same button or key when the orientation sensor data subsequently passes the threshold value.

Preferably, the computer is configured to provide a variable input to a computer application, the variable input corresponding to the orientation sensor data relating to at least one axis.

Preferably, the computer is configured to interpret the orientation sensor data relating to at least one axis as an analogue controller input.

Preferably, the computer is configured to interpret the orientation sensor data relating to each axis as a corresponding joystick axis input.

Preferably, the orientation sensor provides mouse rotation data indicative of the mouse rotation with respect to $X_M$, $Y_M$ and $Z_M$ axes, the computer configured to respectively provide corresponding pitch, roll and yaw commands to a computer application.

It will be appreciated that during tilted mouse operation, the stability provided by the work surface is reduced comparative to conventional mouse movements/operations with the $X_M$, $Y_M$ plane parallel to the $X_{WS}$, $Y_{WS}$ plane with the first base contact footprint in the first orientation and the first contact plane co-planar with the work surface. In particular, when the mouse is in contact with the work surface solely via a single pivot point or pivot axis, the positional stability and accuracy of the mouse is far more reliant on the user's manual dexterity. As previously discussed, the ability to execute mouse button inputs without disturbing the desired mouse position is key in many precision-related computer activities, e.g., gaming, data input, CAD, design, modelling and photo editing.

Inexorably, such positional precision is degraded if the stability of the mouse is reduced, ergo tilting the mouse exacerbates this problem. It may also be readily visualized that the force of a user pushing downwards (i.e negative $Z_M$ axis movement) to click a primary button whilst the mouse is inclined is not counteracted by the resistance of the work surface. The user must thus stabilise the $X_M$, $Y_M$, $Z_M$ axis position and angular tilt orientation solely through the grasp of their other fingers.

The present invention provides a means of ameliorating the destabilising effects of a mouse button input whilst tilted by virtue of the ergonomic and configurational features of the at least one trigger button. As described above, the mouse upper body includes
- a palm rest extending from the rear of the mouse upper,
- at least one trigger button forward of the palm-rest and at least two primary buttons forward of the at least one trigger button, and
- a recess formed;
  - underneath the at least one trigger button, and
  - at least partially, formed by the underside of the trigger button.

The recess enables the user to provide a trigger button input by placing a fingertip placed (at least partially) in the recess under the trigger button and pulling their finger towards the inner surface of their palm. The direction of force applied by the user on the trigger button is thus at least partially upwards and/or rearwards (i.e having a positive $Z_M$ and/or negative $Y_M$ component) of the mouse. This motion provides an effective replication of the instinctive trigger pulling action intuitive to most users. The location of the user's palm on the palm rest during this trigger pulling action also provides a robust and stabilizing platform to counterbalance any potential positional deviations caused by the trigger button pull. Moreover, the stabilisation provided by allowing the force of pulling the trigger button actuation to be at least partially counterbalanced by the user's palm is applicable at any tilt or pitch inclination, and irrespective of dynamic $X_M$, $Y_M$, movements.

Preferably the mouse lower surface includes one or more contact feet extending from the lower surface for contacting the work surface, with the lowermost periphery of the contact feet forming the first base contact footprint positioned in the first base contact plane.

In further embodiments, the mouse includes a second (or more, correspondingly enumerated) base contact footprints, each respectively including one or more corresponding contact feet, forming respective base contact planes. Thus, a second base contact footprint forms a second contact plane, a third base contact footprint forms a third contact plane and so forth.

Preferably each base contact footprint includes multiple spaced-apart contact feet.

Preferably, one or more the mouse contact feet are configured to act as pivot points, fulcrums or edges (hereinafter referred to as 'pivot axis') about which the mouse may rotate, tilt, roll, yaw or pitch when altering orientation.

Preferably at least one pivot axis is defined by at least two pivot points or at least one pivot edge, enabling movement of the mouse about the pivot axis, In one embodiment, at least one pivot axis is divergent from the longitudinal $Y_M$ axis of the mouse.

Preferably, the base contact footprint includes one or more contact feet positioned centrally about a central longitudinal $Y_{MC}$ axis of the mouse lower surface.

Preferably at least one lateral boundary of the first base contact footprint forms a pivot axis and more preferably, at least two opposing lateral boundaries of the first base contact footprint form two pivot axes.

Optionally, at least two such pivot axes are provided, mutually divergent and extending forward from the rear of the mouse on opposing sides of the longitudinal $Y_M$ axis of the mouse. At the forward part of mouse the pivot axes are thus at their maximum separation from each other, tapering to an intersection/origin at or rearward of the mouse rear.

Two pivot axes enable the mouse to tilt the first base contact footprint away from the work surface in two directions, providing the potential for additional functionality over a single tilt direction.

Preferably, said two directions are opposed.

Preferably the optical sensor is located at the rear of the mouse, where the pivot axes are closest and thus the distance of each pivot axis to the optical sensor is minimised. This configuration ensures the distance between the work surface and optical sensor is minimised.

Locating the optical sensor at the rear of the mouse also enables the user to tilt the mouse about a pivot axis such that the front of the mouse tilts to a sufficient degree to provide feedback to the user that the tilt is performed while ensuring that the optical sensor is able to maintain focus in the tilted orientation as there is minimal change in distance from the sensor to the work surface.

Preferably, the lower surface includes lateral contact feet configured to contact the work surface when the mouse is tilted, thus defining the maximum extent of the tilt. The lateral contact feet are positioned (with respect to the $Z_M$ axis) higher than the first base contact plane when the mouse is resting on the first base contact footprint. The lateral contact feet form part of a second base contact footprint. The mouse is thus able to pivot about a pivot axis from the first base contact footprint until the lateral feet of the second base contact footprint contacts the work surface. The mouse can then be slid across the surface, supported by the second base contact footprint.

It will be seen that in one embodiment, the contact feet in the first base contact footprint forming the pivot axis also form contact feet in the second base contact footprint together with the lateral contact feet. Additional pivot axes allow the mouse to pivot until contacting the lateral contact feet of corresponding base contact footprints. Preferably, a third base contact footprint is formed on an opposing side of the longitudinal $Y_M$ axis to the second base contact footprint.

It will be understood that pivot axes are not restricted to the above examples and may be configured in any orientation to allow the mouse to tilt from the first base contact footprint in any direction(s) desired.

As an example, the mouse may be tilted forwards and/or backwards from the first base contact footprint about pivot axes orientated substantially parallel with the $X_M$ axis. Different users of the mouse may have different preferences as to how much movement of the mouse should be required to activate a different mouse mode or how much force must be applied to tilt the mouse. This could be influenced by the degree of wrist-rotation or hand movement the user requires to provide sufficient feedback that the mouse has been tilted while not stressing the wrist muscles.

Increasing the tilt threshold angle required may be achieved by:
- increasing the vertical separation (in $Z_m$ dimension) between the lateral contact feet and the pivot axis, e.g. by providing adjustable feet, or replaceable feet of different thicknesses or
- altering the lateral separation (in $X_m$ dimension) between the lateral contact feet and adjacent pivot axis.

However, increasing the tilt required to activate a different mode may increase the distance between the optical sensor and the work surface, potentially causing the optical sensor to lose focus.

It is also undesirable for the user to accidentally tilt the mouse when clicking a button on the mouse upper. The stability of the mouse is defined by the distribution of the contact feet forming the base contact footprint, a larger separation leading to greater stability but requiring more force to tilt the mouse. It is therefore advantageous to provide the user with some adjustability to achieve a desired level of stability and ease of tilt.

Thus, in preferred embodiments, the position of one or more contact feet forming the first base contact footprint is adjustable to adjust the position of at least one pivot axis relative to the longitudinal $Y_M$ axis.

In one embodiment, a single pivot axis is provided by the first base contact footprint on each side of the longitudinal $Y_M$ axis. In alternative embodiments, the second (and/or third) base contact footprints may include tilt axis boundaries to further base contact footprints. The stability and ease of tilt of the mouse can thus be adjusted while maintaining a constant tilt threshold angle.

Although the mouse may be slid across the work surface and/or rotated about the $Z_{WS}$ axis whilst solely in contact with contact feet of a single pivot axis, the stability is diminished. In contrast, by allowing the mouse to be tilted sufficiently to also rest on the lateral contact feet of the new base contact footprint, the stability is greatly increased for position and button actuation manipulation.

In a preferred embodiment, the first base contact footprint includes at least two adjustable portions, laterally adjustable to increase the separation of the contact feet in the first base contact footprint.

Preferably the adjustable portions (hereinafter referred to as linked feet assembly) each include one or more of the contact feet and preferably also include at least one the lateral foot. Forming the linked feet assembly with both the contact feet of the first base contact footprint and the lateral feet from the adjacent base contact footprints ensures that the vertical and horizontal separation (and thus also the tilt range) between the pivot axes and corresponding lateral contact feet is constant.

The linked feet assemblies are preferably locatable, or positionable on the mouse lower surface in a plurality of orientations or locations at differing lateral separation to the longitudinal $Y_M$ axis, thus providing the ability to adjust the stability of the base contact footprint.

The varying locations of the adjustable portions may be provided by mating or interlocking components, e.g. a series of detents, magnets, sockets, protrusions, or other equivalent components mating with corresponding parts on the adjustable portions, releasable to alter the position.

In preferred embodiments, the linked feet assembly are detachable from the mouse lower surface.

According to further aspects, one or more of the contact feet are independently locatable, or positionable on the mouse lower surface in a plurality of orientations or locations at differing lateral separation to the longitudinal $Y_M$ axis.

Preferably, the first base contact footprint is reconfigurable to alter the angle of divergence between the two pivot axes.

Preferably, the first base contact footprint is reconfigurable to increase the lateral separation of a pivot axis to the longitudinal $Y_M$ axis.

Preferably the upper body includes a palm rest extending over a portion of the rear of the mouse upper and a pair of forward buttons at a forward portion of the mouse upper.

The mouse preferably has at least one lateral extension to the base portion for a user resting one or more fingers on.

Preferably, the mouse includes a thumb lateral extension and a ring finger lateral extension on an opposing lateral side of the mouse to the thumb lateral extension. The lateral extensions are multifunctional extensions, providing rests for the user's fingers and also making it easier for the user to tilt the mouse by pressing down on a lateral extension to pivot the mouse about a pivot axis.

Preferably, at least one contact foot is located directly beneath at least one of the lateral extensions.

A user may manually push on a lateral extension to pivot the mouse about a pivot axis such that the second or third base contact footprint supports the mouse on the work surface. Thus, the user may tilt the mouse via tilt axis on opposing lateral sides of the mouse by using either the thumb or the little/ring finger.

Preferably at least one button is a bidirectional button, wherein the communication system provides a:
first input signal to the computer when the bi-directional button is moved in a first direction and
second input signal to the computer when the bi-directional button is moved in a second direction.

The two directions of the bidirectional button may be opposing, perpendicular or parallel.

In one embodiment, at least one multi-directional button is provided, wherein the communication system provides different input signals to the computer with differing directional movements of the multi-directional button.

Preferably at least one button is a multi-directional button, wherein the communication system provides input signals indicative of the direction the multi-directional button is moved.

Preferably, at least one of the buttons is a multi-stage button, wherein the communication system provides different input signals to the computer depending on which stage the multi-stage button is pressed to.

Preferably, at least one of the buttons includes a positional sensor capable of determining the position of a button relative to the mouse body and outputting a signal indicative of the button position.

Preferably, at least one of the buttons includes a force transducer capable of outputting a signal indicative of the force applied to the button. As used herein, the term 'force transducer' should be interpreted to encompass pressure sensors, strain gauge sensors, piezoelectric sensors or any other sensors capable of providing an electrical output dependant on the force applied to a button. Alternatively, linear or rotational position sensors may be utilised to determine the position of the button relative to a start position and output a signal indicating the position. Examples of such positional sensors include hall sensors, potentiometers or the like.

Preferably, at least one of the contact sensors includes a force transducer capable of outputting a data signal indicative of the force applied to the contact sensors.

Preferably, the mouse includes a scroll wheel with a force transducer capable of outputting a data signal indicative of the force applied to the scroll wheel.

Preferably, the computer is configured to provide at least one command to an application when the force sensor data indicates the force passes a predetermined threshold force value. Thus, a user may provide more than one input to the computer by pressing a single button, the computer registering a first command on clicking of the button and a further command on pressing the button with greater force past the threshold reference value. Further threshold values may be set to provide further commands as the user applies more force to the button.

The force-sensitive button may thus use force threshold values as commands for the computer. Such a command is useful in computer games where the use may want to initiate for example zoom in 'sniper mode' which typically requires a RIGHT CLICK command to initiate sniper mode and then a scroll-wheel rotation forward to 'zoom' in. The mouse thus requires the user only press a single button (RIGHT CLICK) and then apply sufficient force to pass a threshold value upon which the computer sends a SCROLL-WHEEL FORWARD command to the game and resets the zoom level when the user releases the RIGHT CLICK. This enables multiple commands to be assigned to a single button by varying the force applied to the button.

Preferably, the at least one command includes a press of at least one button, keyboard key or key combination when the force transducer data passes the threshold force value and a release of the same button, key or key combination when the force transducer data subsequently passes the threshold force value.

In one embodiment, the at least one command includes a positive axis movement value when the force transducer data passes the threshold force value and a negative axis movement value or reset to axis zero when the force transducer data subsequently passes the threshold force value.

Preferably, the at least one command includes a press of a button, keyboard key or key combination when the force transducer data passes the threshold force value and a second press of the same button, key or key combination when the force transducer data subsequently passes the threshold force value.

The force threshold values may be set by the user when the mouse is orientated with the base contact plane parallel with the work surface. However, when the mouse is tilted (e.g. to operate in another mode or provide another command to the computer) it may become more difficult to apply the preset threshold force to the button. Therefore, in one embodiment, the threshold force value is preferably automatically altered if the orientation sensor data passes at least one predetermined threshold orientation value.

Preferably, the computer is configured to provide a variable input to a computer application, the variable input corresponding to the force transducer data. Thus, a variable computer input such as a zoom level may be produced proportional or at least dependant on the force applied to the button.

Preferably, the computer is configured to interpret the force transducer data as an analogue controller input. Thus, a variable computer input such as a joystick axis value may be produced proportional or at least dependant on the force applied to the button.

Preferably, the at least one trigger button includes an interchangeable cap. Users In another embodiment, multiple buttons may include interchangeable caps.

Preferably at least two of the buttons are locatable in a plurality of longitudinal positions relative to the $Y_M$ axis of the mouse.

Preferably, the adjustable buttons are located rearward of the left/right click buttons. Hand size amongst users is highly variable and thus it is advantageous to provide positional adjustability of fingertip buttons.

Preferably, the mouse includes a physical feedback module such as a haptic feedback vibratory motor or similar. The physical feedback module may be configured to provide physical feedback in response to a user interaction with the mouse, the user interaction including a tilt, yaw, angular acceleration, lift, button activation, level of button movement or force applied thereto, or any other user interaction with the mouse.

In preferred embodiments, the physical feedback module is configured to provide an intensity or magnitude of physical feedback proportional to at least one of: mouse movement, button movement or force applies to a button.

It will be appreciated that the computer may be configured to operate in numerous ways in response to the various input signals the mouse communication system sends to the computer. Tilting the mouse may for example send a signal to the computer running a vehicle driving simulator, the signal indicating degree of tit and the driving simulator interpreting the input signal as a proportional turning of the steering wheel of the virtual vehicle.

Many users may wish to make very small movements of the cursor in computer applications which can prove difficult as it requires fine movement of the mouse. Prior art solutions include both hardware and software solutions. A typical hardware solution for making fine movements in the UI involve reducing the mouse sensitivity to movement (i.e. the DPI). Software solutions range from enlarging the UI element being manipulated to scaling the cursor movement to reduce the on-screen movement per given unit of physical movement of the mouse.

However, the aforementioned prior art solutions still require precise movement of the mouse in two dimensions which can prove difficult for many users. Precise movement can be achieved by keyboard commands such as the TAB or ARROW keys which are typically interpreted as a singular movement between UI elements per keypress. It would be advantageous to enable the mouse to provide such unit-increment commands in an ergonomic way.

Thus, in one embodiment the second mode includes a unit-increment mode wherein a given threshold distance of mouse movement is interpreted by the computer as movement of a mouse cursor or selected UI element by one unit of movement. The unit of movement may be a pixel, unit of measure (e.g. 1 mm), character or an interactive user interface element such as a spreadsheet cell, menu item, database field or any other discrete unit.

The mouse driver software on the computer may receive movement signals from the mouse indicating a distance, speed and/or direction of movement and convert to a signal recognisable by the computer as a control input. Preferably, a threshold distance moved by the mouse indicates a unit of movement, e.g. a movement of 2 mm to the right may be interpreted as a single right arrow keyboard command and a 4 mm movement as two right arrow keyboard commands.

Preferably, the mouse includes a physical feedback module such as a haptic feedback vibratory motor or similar and provides physical feedback to the user each time the mouse moves the threshold distance, thereby providing physical feedback to the user each time they move one unit of movement.

Many computer games involve a user controlling a virtual character in a game environment, keypresses moving the character and mouse movement changing the view direction of the character. One difficulty faced by users is in moving in a particular direction while having a different view direction as the forward or rear movement direction is respectively bound to the view direction or opposite thereof. Maintaining a different view direction is typically only achieved by 'strafing' i.e. moving left or right while orientating view direction differently. It would be advantageous to enable a character to view in a different direction to character movement in any other direction, not limited to side-ways or forward/rearward movement, thus simulating a twisting of a user's upper body or head to face one direction while moving in another direction.

While such a solution is easily feasible to implement in software, one of the difficulties is in providing a user control that is intuitive and functional to provide the necessary inputs. Typically, only joysticks or similar controllers would include a suitable control, e.g. a yaw input. However, joysticks do not provide the precision of positional movement achievable with a mouse, which is why joysticks are deemed inferior to a mouse for first-person character control.

In one preferred embodiment, the mouse is configured to provide an input signal (hereinafter 'yaw' signal) to the computer when the mouse is rotated with respect to the $Z_M$ axis.

Preferably, the yaw signal includes angular movement information, thus indicating the angular movement of the mouse. The yaw signal may alternatively, or in addition include angular acceleration and/or speed information.

Preferably the yaw signal is activated in response to a threshold angular acceleration, angular rotation and/or speed of rotation.

The yaw signal may also be utilised in vehicle and flight simulators to provide yaw input to the software analogous to a yaw input on joysticks.

A computer mouse as claimed in, wherein the mouse includes a detachable cradle contact foot with multiple pivot axes, the mouse and cradle contact foot rotatable together about the pivot axes.

A computer mouse as claimed in, wherein the cradle contact foot is magnetically coupled to the mouse.

A computer mouse as claimed in, wherein the contact foot is magnetically coupled to the mouse by at least one pair of magnets, one magnet located in the foot and the other magnet located in the mouse.

A computer mouse as claimed in, wherein the contact foot is magnetically coupled to the mouse by at least three pairs of magnets, one magnet of each pair located in the foot and the other magnet of each pair located in the mouse, wherein at least one pair of magnets is arranged with opposite polarity to at least one other pair.

A computer mouse as claimed in, wherein the cradle contact foot includes a central portion forming a cradle base contact footprint and at least one inclined surface extending from the central portion forming at least one further cradle base contact footprint.

A computer mouse as claimed in, wherein the further base contact footprint is formed by an arcuate surface at least partially surrounding the central portion.

A computer mouse as claimed in, wherein the cradle contact foot includes at least four pivot axes.

It will be appreciated that the mouse may require driver software to match the extensive functionality the aforementioned mouse provides. The driver software provides a software interface to the mouse, enabling the operating system and other computer programs to access hardware functions of the mouse.

The driver software communicates with the device through a computer bus or communications subsystem, typically either wireless (Bluetooth or RF), or USB. When a calling program invokes a routine in the driver software, the driver software issues commands to the mouse. Once the mouse sends data back to the driver software, the driver software may invoke routines in the original calling program.

Prior art mice with a plurality of buttons and controls typically have dedicated driver and configuration software for configuring the computer. This configuration software enables the user to configure the driver software to provide definable inputs to the computer. The configuration software will often have a user-interactive Graphical User Interface (GUI) displaying the buttons or other controls of the mouse to enable the user to alter various functions of the mouse, e.g. they may alter "button 4" to run a macro defined as keyboard keypresses "CTRL+C" such that when the user clicks button 4 the driver sends a CTRL+C command to the active computer application.

The aforementioned mouse has many inputs that can be used simultaneously and typical prior art configuration software and driver software is unable or at least unsuited to make use of this functionality.

The computer driver software preferably provides the ability to provide a control of the mouse functions such that at least one of the user controls of the mouse may provide at least two inputs to the driver software e.g. initiation and termination data signals representing any multiple state user control, such as a click down and then release.

It will be appreciated that user controls with a variable input such as orientation, pressure, rotation, geomagnetic or travel sensors may provide a variable input, analogue inputs or multiple digital inputs.

According to another aspect of the present invention there is provided a computer program, embodied in computer-executable instructions, executable to:
  receive a first data signal from the mouse upon a change in state of a first user control of the mouse;
  receive a second data signal from the mouse upon a change in state of a second user control of the mouse, the second control being different to the first control;
  receive a third data signal upon a further change in state of the second user control of the mouse;
  process the data signals and provide at least one command to at least one computer application.

According to another aspect of the present invention there is provided a computer program, embodied in computer-executable instructions, executable to:
  receive a first data signal from the mouse upon a change in state of a first user control of the mouse;
  receive a second data signal from the mouse upon a change in state of a second user control of the mouse, the second control being different to the first control;
  receive a third data signal from the mouse upon a change in state of a third user control of the mouse, the third control being different to the first and second user controls;
  receive a fourth data signal upon a change in state of the third user control of the mouse;
  process the data signals and provide at least one command to at least one computer application.

According to another aspect of the present invention there is provided a computer program, embodied in computer-executable instructions, executable to:
  receive a first data signal from the mouse upon a change in state of a first user control of the mouse;
  receive at least one subsequent data signal from the mouse upon a change in state of a different user control of the mouse;
  receive N data signals from the mouse upon changes in state of N different user controls of the mouse; and
  process the data signals and provide at least one command to at least one computer application, wherein N is greater than two.

The computer software may thus provide a hierarchical dependency control method with the computer inputs depending on the sequence and combination of user inputs. The user inputs may thus be configured to be multiply dependent.

Preferably, the computer program processes the data signals as they are received and provides inputs to the computer application without waiting for completion of the data signal sequence.

Preferably, multiple commands are provided, an input at one or more individual data signals being received from corresponding state-changes.

As used herein, the term "user control" should be understood to refer to any control on the mouse such as a button, switch, orientation sensor, pressure sensor, analogue input or the like.

According to another aspect of the present invention there is provided a computer program for configuring the driver software, embodied in computer-executable instructions, executable to display a Graphical User Interface (GUI) on a display screen for representing the configuration options of the driver, the GUI displaying a hierarchical view of multiple user controls to display dependency of at least one computer input on:
state of at least one user control and
change in state of at least two further different user controls.

Preferably, the computer mouse is configured to operate in a first mode when orientated in a first orientation, and a second mode when orientated in a second orientation where the orientation of the first base contact plane in the first and second modes is non-parallel.

Preferably, the movement sensor system is configured to detect device movement and/or position relative to the work surface in both the first and second modes.

Preferably, wherein the movement sensor system is an optical movement sensor system including:
a light source configured to illuminate the work surface, and
an image sensor or array, configured to receive reflected light from the work surface to capture an image of the work surface, wherein successive captured images are compared to determine device movement.

Preferably the image sensor or array is configured to capture an image of the work surface in both the first and second modes, wherein successive captured images are compared to determine device movement in both the first and second modes.

According to a further aspect, the present invention includes at least one mode sensor configured to initiate a said mode.

Preferably, the mouse is configured to operate in
a first mode when orientated in a first orientation, and
a second mode when orientated in a second orientation where the first base contact plane is inclined with respect to the first orientation and a said mode sensor is configured to initiate the first or second mode when the mouse is in the first or second orientation respectively.

Preferably, the second orientation includes inclination of the first base contact plane with respect to the work surface by between 1 and 10 degrees and more preferably between 1 and 6 degrees.

Preferably the mouse is configured to provide position data signals calculated using movement data of the computer mouse as detected by the movement sensing system relative to a start position.

According to a further aspect, the first mode includes a pointing mode, and in the pointing mode the computer mouse is configured to generate the movement or position data signals indicating on-screen pointer movement or position respectively.

Preferably, the mouse is configured in the second mode to provide touch events to the computer.

Preferably, the mouse is configured to translate the movement or position data signals into corresponding movement and/or position touch events.

Preferably, the computer mouse provides the movement or position data signals to the computer and the computer is configured to translate the data signals into corresponding movement and/or position touch events.

According to a further aspect, the present invention includes a computer mouse configured to provide a touch event at a predetermined start position upon initiation of the second mode by the mode sensor, the computer mouse generating a position data signal corresponding to the start position.

Preferably, the computer mouse is configured to generate a corresponding touch event upon initiation of the second mode by the mode sensor.

Preferably, the mouse is configured to provide position data signals to the computer indicating a start position at a position representing an edge of a display screen connected to the computer, by two successive touch events.

Preferably, the mouse is configured such that any subsequent swipe gesture performed in the second mode after the successive touch events is provided as position and/or movement data signals indicating a touch event in a corresponding direction away from a given edge and wherein the given edge is inferred by the direction of the swipe gesture.

Preferably, the computer mouse is configured to provide a position data signal indicating a touch event at a restart position after a device movement interpreted as a swipe gesture, the swipe gesture being a movement of the computer mouse from a start position in the second mode.

According to a further aspect, the start position is the position of an on-screen pointer when in the pointer mode before the second mode is initiated.

Preferably, the start position is a position corresponding to a centre, corner or edge position of a display screen connected to the computer.

Preferably, the computer mouse is configured to provide data signals to the computer when the mouse moves to a predetermined position, the data signals including a data signal corresponding to an end of a touch event, followed by a position data signal indicating a restart position for a subsequent touch event.

According to one aspect of the present invention, the predetermined position is within a threshold distance of an edge corresponding to an edge of a display screen connected to the computer.

Preferably, the mouse is configured to reposition an on-screen pointer or touch event to the start position after a swipe, flick, scroll or custom gesture.

Preferably, the computer mouse includes a movement sensor system capable of detecting device movement relative to a work surface. The movement sensor system may also be generating device movement information in the form of movement data signals capable of being read by the computer.

The movement sensor system may also generate device position information in the form of position data signals capable of being read by the computer. The position information may be generated by detecting movement relative to an initial reference or 'start' point and calculating the displacement from the start point.

The movement and position data signals may respectively indicate movement and position coordinates within a virtual two-dimensional reference area having at least three edges. The reference area can be used as a reference representing a computer display screen, touchpad or other potential input area of the computer.

The position data signals preferably indicate a relative position of the computer mouse as a proportion of the reference area, e.g. the position data signal may indicate a position as 56% vertical and 22% horizontal indicating a position at 56% of the display screen vertical dimension and 22% of the display screen horizontal position relative to reference screen edges. The computer mouse can thus be used with any screen resolution or size without further configuration or calibration as the movement and/or position is simply scaled to the screen size.

In a further embodiment the movement data signals include an indication of device movement speed relative to the work surface.

It will be appreciated that a conventional computer mouse may use an optical system comprising an image capture sensor or array that is positioned over an aperture open to a work surface illuminated by a light source such as an LED or Laser. A lens focuses the light from a focus zone of the surface to the image sensor and lens, which are orientated parallel to the work surface. The image capture sensor detects device movement by capturing successive images and comparing the images to determine relative movement.

The movement information is transmitted to the computer and translated to mouse cursor movement on the display. However, a typical mouse optical system will not track movement when the mouse is lifted as the image sensor receives an image out of focus such that successive images cannot be compared accurately and movement therefore not detected. This deactivation when out of focus is an important function of a conventional mouse as the user needs to be able to lift and reposition a mouse to move a mouse cursor large distances, repeat scrolling/panning movements, re-position their hand for comfort without moving the cursor or otherwise manipulate the mouse without moving the cursor. Conventional mice will also not work if they are inclined away from the work surface as the optic sensor again loses focus and therefore must be operated parallel to and directly above the work surface at the lens focus point.

Thus, in one embodiment, the movement sensor system is an optical movement sensor system including:
  a light source configured to illuminate the work surface, and
  an image sensor, configured to receive reflected light from the work surface to capture an image of the work surface, wherein successive captured images are compared to determine device movement.

In use in the first orientation, the first base contact footprint is typically placed on a planar work surface, thereby orientating the first base contact plane co-planar with the work surface and in the second orientation, the first base contact plane is inclined with respect to the work surface. Thus, the second mode is only activated when the computer mouse is inclined such that the first base contact plane is inclined from the work surface.

The inclination is effected by a rotation of the first base contact plane about a reorientation axis which may include components in both the $X_M$ and $Y_M$ axes (and may alternatively be designated by the $X_{WS}$ and $Y_{WS}$ frames of reference). It will be appreciated that the most comfortable rotation for a user holding the computer mouse will be a lift of the device, a rolling of the wrist and a slight backwards tilt. The mouse may also be lifted to assist in the reorientation.

Preferably the optical movement sensor system is located and configured such that the image sensor captures images exceeding a threshold level of clarity, resolution, edge-contrast to other parameter such that the movement sensor system can detect differences between successive images indicating movement in both the first and second orientations.

It will be appreciated that the image sensor may have some tolerance in processing images and so may be able to process slightly unfocused images from the work surface. Thus, reference herein to substantially focused should be interpreted to mean focused within the tolerance limits of the image sensor used and need not be perfectly focused.

Preferably, the optical sensor also includes a light source orientated to irradiate light onto the work surface beneath the optical componentry and more preferably at the focal zone of the optical componentry.

Preferably, the computer mouse includes a communication system capable of communicating contact sensor signals to a computer and associated display screen to provide input signals for software operating on the computer.

It will be appreciated that in an alternative embodiment the modes may be swapped i.e. the second mode is operational when in the first orientation and the first mode operational when in the second orientation.

It will be appreciated that the reorientation may include translation as well as rotation and may include multiple movements or a three-dimensional path. However, to aid clarity, reference will be made to rotation about a reorientation axis about which the computer mouse is rotated between the first and second orientations. Reference to such a reorientation axis should not be deemed limiting to a singular axis or movement direction.

In one embodiment, the computer mouse may include an orientation sensor.

The second mode may be activated by inclining the base contact footprint past a threshold inclination as detected by the orientation sensor. The orientation sensor may for example include a gyroscope or magnetometer.

Preferably, the computer mouse includes a communication system capable of communicating the movement sensor signals to a computer.

The communication system preferably includes a wireless communication system such as a Radio Frequency (RF) transceiver and more preferably includes an RF chip capable of supporting Bluetooth wireless standards.

The computer mouse is preferably configured to halt movement sensor signal generation when the image sensor detects an out of focus image. Thus, a user may lift to reposition the computer mouse without on-screen pointer movement or gesture GUI movements.

Preferably, when in the first and second modes, the computer mouse is configured to generate data signals for a computer indicating the computer mouse is operating in the first and second modes respectively.

Preferably, the first mode is a pointing mode, wherein the computer mouse generates movement data signals indicating movement of the computer mouse and results in on-screen pointer movement.

In one embodiment, the second mode includes a gesture mode and the computer mouse is configured to generate movement data signals interpretable by a computer as swipe gestures.

As referred to herein the term "swipe" refers to a type of user command for a computer resulting in movement of GUI elements such as GUI pages, icons, text, screens or windows. Example swipe movements include pan (vertical and/or horizontal movement), scroll (vertical movement) and flick (rapid vertical or horizontal movements). Thus, a relatively slow computer mouse movement away from the user in the $Y_{WS}$ direction may be interpreted as an upward screen scroll.

The swipe gestures may also include custom gestures such as shapes, alphanumeric characters, symbols or patterns, thereby providing additional controls and potential commands.

The gesture mode is particularly useful in document and browser navigation or for use with touch-screen computers which are configured to receive gesture inputs from a user's finger e.g. in gesture mode the computer mouse may provide computer commands interpreted as finger swipe gestures without requiring a user to touch the screen.

In another embodiment, the second mode includes a drawing mode wherein the computer mouse is configured to generate movement data signals interpretable by a computer as movement of a computer software drawing element such as a digital pen, brush or the like. The drawing mode is particularly useful when manipulating Art, Drawing, Computer Aided Drafting (CAD) or similar software programs as a user may easily switch between the pointing and drawing modes using only the computer mouse and not requiring additional keyboard commands or on-screen GUI element selection.

The aforementioned embodiments thus provide an enhanced computer mouse that can conveniently and quickly shift between operating modes to offer additional functionality over a conventional computer mouse.

It will be appreciated that the computer may be required to have suitable software to correctly interpret the computer mouse signals. However, the computer mouse is preferably configured to generate data signals of a generic or widely utilized standard and for example in the first mode the computer mouse generates data signals matching conventional mouse movement data signals and in the second mode generates data signals matching fingertip or stylus contact signals.

Preferably, an on-screen trace is displayed when in the gesture mode, the trace matching the movement of the computer mouse.

The computer mouse preferably includes a computer memory chip for storing operating instructions and preferably includes a non-volatile memory chip to avoid the need for a continuous power supply to maintain memory state. The memory chip is preferably writable by connection to an internet user interface for programming the chip.

A common implementation of a swipe gesture involves movement of the finger over the touch-screen from one side to another, upwards or downwards resulting in a movement of the GUI objects, e.g. to flip through pages of an e-book, application or the pages on a home-screen. A finger is lifted and returned to the centre portion of the display to repeat the gesture for multiple pages. However, a conventional on-screen cursor does not emulate the finger-movement as the cursor must track back over the screen to reach the centre portion for multiple swipes. This action may be interpreted by the computer as a swipe in the reverse direction or requires software to ignore the reverse track.

Thus, in one preferred embodiment, the mouse is configured to provide a fingertip input at a predetermined start position when the mode sensor is activated. Preferably, the start position is the position of the on-screen pointer when in the pointer mode, before entering the gesture mode.

In alternative embodiments, the start position may be a centre, corner or edge position or other predefined position.

Preferably, the mouse is configured to indicate a start position as an edge position by making two successive activations of the mode sensor within a predetermined time period. In a further embodiment, any subsequent swipe gesture is provided as movement of a finger from the start position such that a swipe in the left, right, up or down direction will be interpreted as a finger swipe inward, respectively from the right, left, bottom or top screen edge. Thus, the mouse may be used to make screen-edge gestures by first double tapping the mode sensor.

According to another aspect of the present invention, there is provided a computer mouse as aforementioned and configured to reposition an on-screen pointer to a 'start' position after a swipe gesture when the computer mouse is in the gesture mode.

Preferably, the pointer is repositioned when the pointer reaches a predetermined portion of the screen. Preferably, the predetermined position is a position within a threshold distance of the edge of the screen and more preferably is within 10% or 5% distance of the screen edge.

In one embodiment, the computer mouse may be configured to reposition an on-screen pointer to the 'start' position after a swipe gesture travels a predetermined length and more preferably a predetermined proportion of the screen. In a further embodiment, the predetermined proportion is at least 30% and more preferably at least 50%.

In a further embodiment, the proportion or threshold distance may be device-dependent, application-specific or set by a user.

In one embodiment, the computer mouse is configured to reposition an on-screen pointer to the 'start' position after a flick, scroll or custom gesture.

The repositioning of the pointer is affected by the computer mouse detecting the swipe gesture, determining whether the pointer needs to be repositioned and sending a subsequent data signal indicating the 'start' position for the pointer to be displayed at.

Thus, a user can operate the computer mouse in a more similar manner to using a finger or stylus than a conventional mouse as the on-screen pointer can be re-centred after a gesture without tracking back over the screen, registering as a reverse swipe or requiring the user to manoeuvre the computer mouse back to a start position.

In one embodiment, the computer mouse is configured to deactivate and/or hide on-screen pointer movement when in the gesture mode, the on-screen pointer respectively remaining in a static position or no longer be displayed while the mouse remains in the gesture mode. Thus, a user may operate the computer mouse in the gesture mode without visible interference from the on-screen pointer/mouse cursor.

Preferably the computer mouse includes:
  at least one user input control for receiving user input to control the device;
  at least one writeable memory storing device configuration data, the device configuration data being read by the device to determine operational characteristics of the device;
characterized in that the device is capable of entering a configuration mode wherein the device is configured to:

send signals to the computer upon receiving user input to the at least one user input control, the signals corresponding to keyboard key-presses, sequences and/or combinations thereof; and write data to the memory device to modify the device configuration data as a result of user manipulation of a said user input control.

Preferably the keyboard codes sent to the computer by the device are indicative of sequences and/or combinations of key-presses The computer mouse may have a computer interface unit provided in the form of a cord connection to the computer or a wireless chip to transmit signals via RF, Microwave, Bluetooth or other wireless protocols.

The mouse preferably includes a display screen, the display screen configured to display information indicative of the data signals generated by at least one of the following:
- a mode sensor;
- a force transducer;
- the optical sensor;
- an orientation sensor;
- an accelerometer.

BRIEF DESCRIPTION OF DRAWINGS

Further aspects of the present invention will become apparent from the following description which is given by way of example only and with reference to the accompanying drawings in which:

FIG. 5a shows a front view of the mouse of FIGS. 1-4 with a first base contact footprint contacting a work surface;

FIG. 5b shows a front view of the mouse of FIGS. 1-4 with a second base contact footprint contacting a work surface;

FIG. 5c shows a front view of the mouse of FIGS. 1-4 with a third base contact footprint contacting a work surface;

FIG. 15a-15c respectively show a section of text with a word, line and paragraph selected;

FIG. 16 shows a screenshot of picture editing software;

FIG. 20a shows a cradle contact foot for attachment to the mouse of FIGS. 18 and 19;

FIG. 20b shows the cradle contact foot of FIG. 20a attached to the mouse;

FIG. 24 shows another example of a graphical user interface of configuration software according to one embodiment for configuring a mouse driver.

BEST MODES FOR CARRYING OUT THE INVENTION

Figure 1:
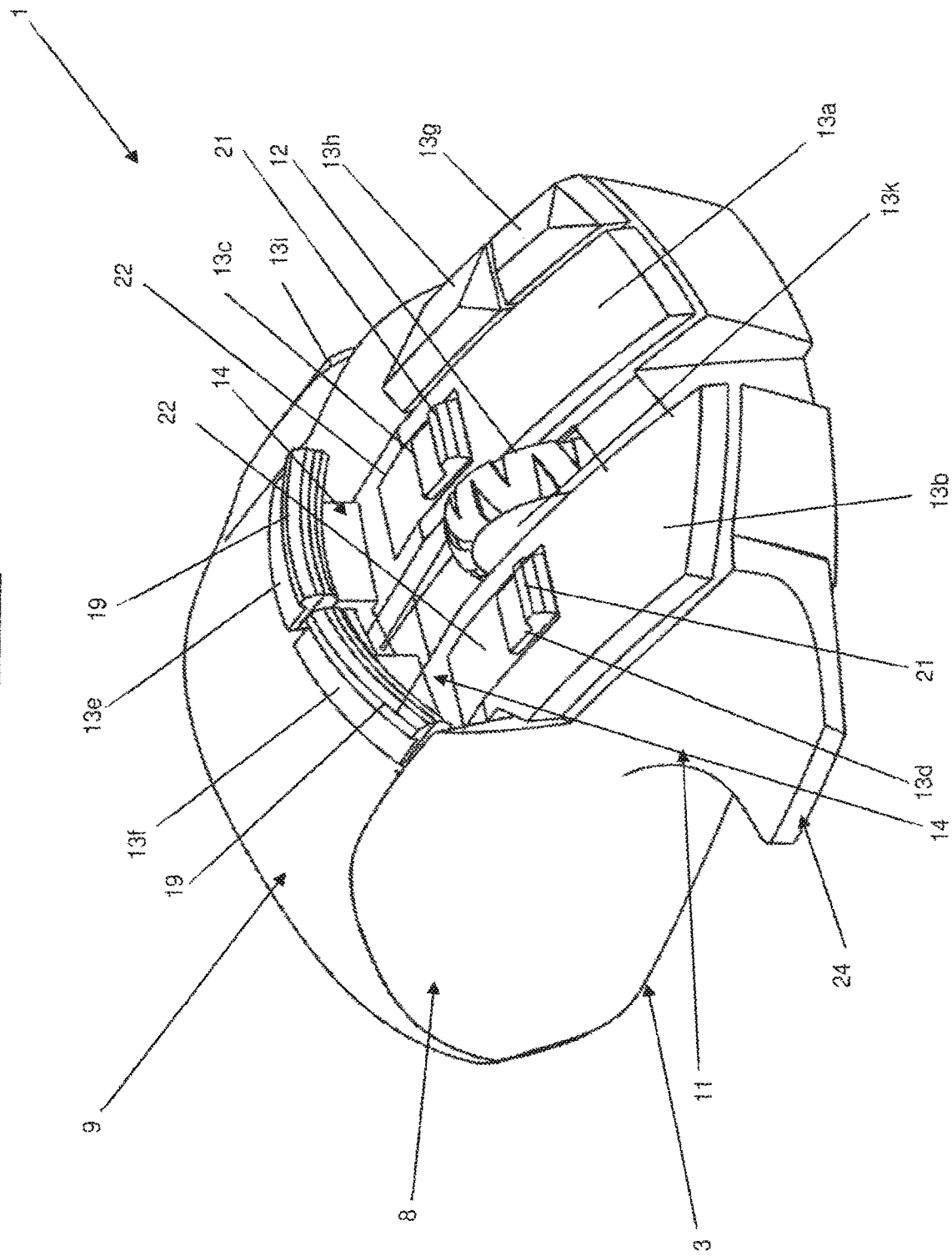
FIG. 1 shows a computer mouse according to one embodiment of the present invention.
Figure 2:
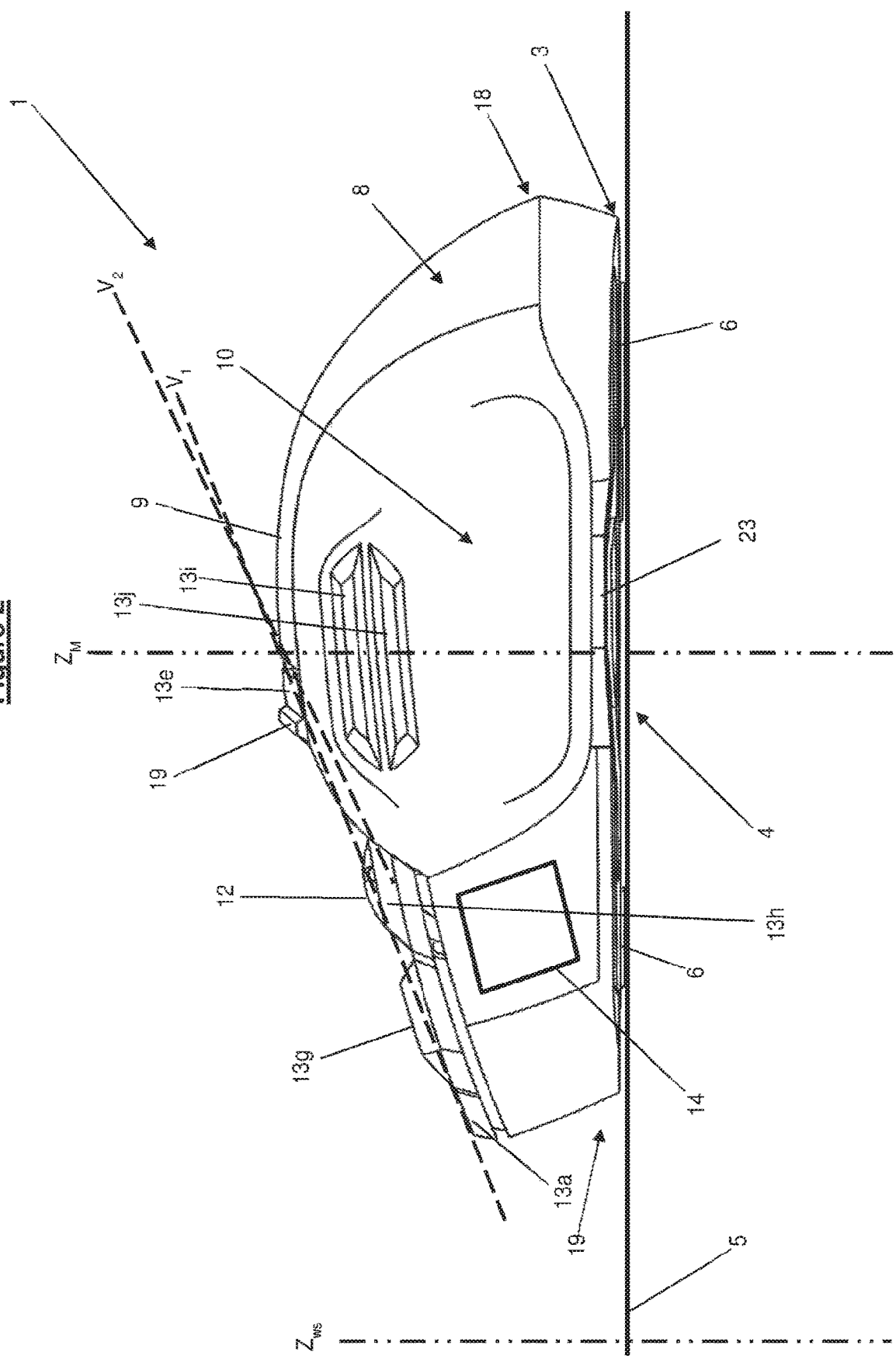
FIG. 2 shows a left side elevation of the computer mouse of FIG. 1.
Figure 3:
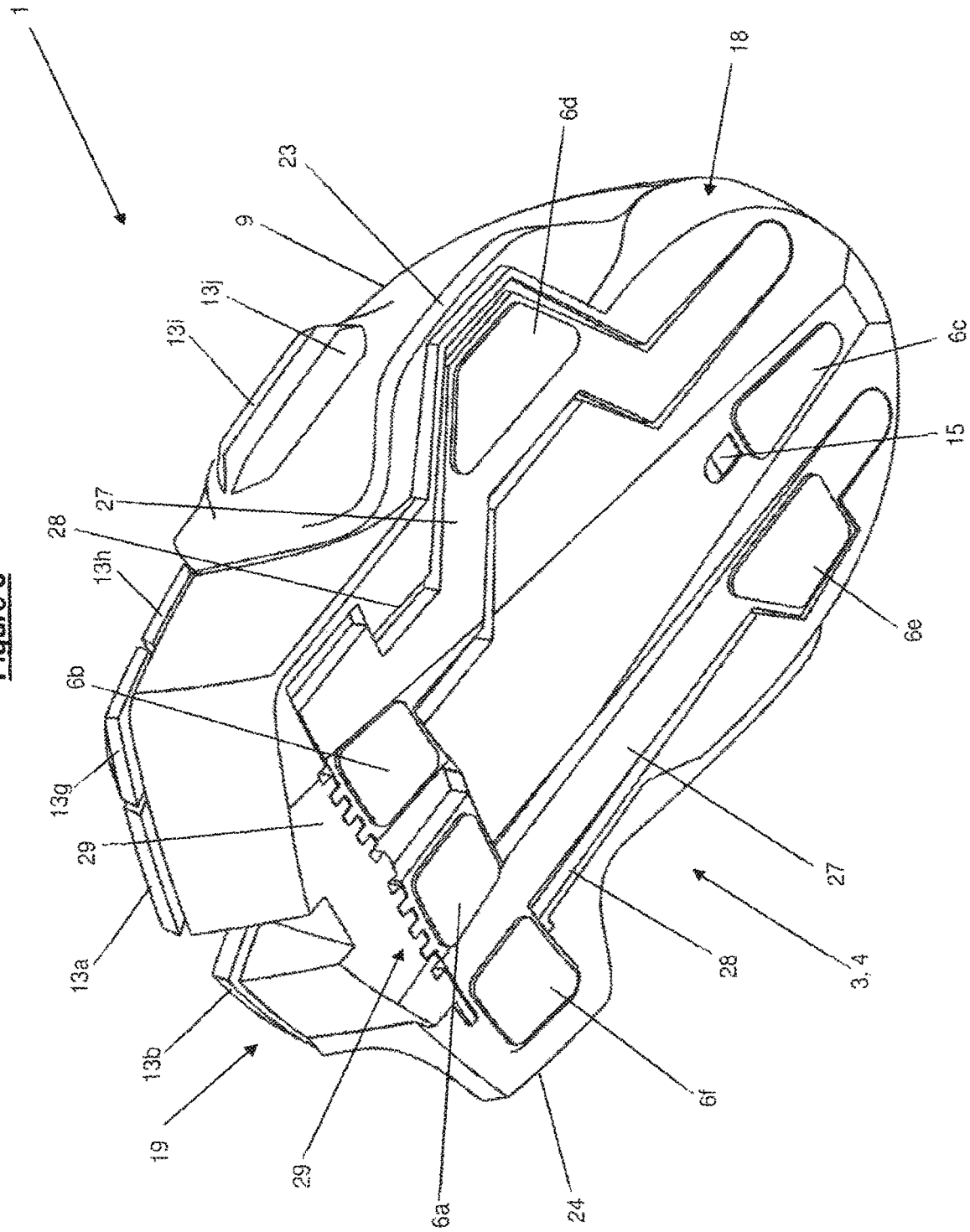
FIG. 3 shows an underside view of the computer mouse of FIGS. 1-2.

Drawing reference numeral table.

| | |
|---|---|
| 1 | Mouse |
| 2 | Computer |
| 3 | Base |
| 4 | Lower surface |
| 5 | Work surface |
| 6a-6f | contact feet |
| 7a-7c | Base contact footprints |
| 8 | Upper body |
| 9 | Palm-rest |
| 10 | Thumb-engaging surface |
| 11 | Finger-engaging surface |
| 12 | Scroll wheel |
| 13a-13k | Buttons |
| 14 | Recess |
| 15 | Optical movement sensor |
| 16 | Trigger button ridge |
| 17 | PCB |
| 18 | Rear of mouse |

-continued

| 19 | Front of mouse |
|---|---|
| 20a-20c | base contact planes |
| 21 | fingertip button ridges |
| 22 | button adjusting channels |
| 23 | left lateral extension |
| 24 | right lateral extension |
| 25 | left pivot axis |
| 26 | right pivot axis |
| 27a, 27b | linked feet assemblies |
| 28a, 28b | foot assembly slots |
| 29 | slot tooth recesses |
| 30 | linked feet assembly teeth |
| 31 | step in upper |
| 32 | force transducer |
| 33 | upper PCB |
| 34 | spacer |
| 35 | lower PCB |
| 36 | dashed line |
| 37 | finger |
| 38 | fingertip |
| 39 | proximal phalange |
| 40 | detachable foot |
| 41 | display screen |
| 42 | cradle contact foot |
| 43 | cradle contact foot center |
| 44 | arcuate surface |
| 45a-45d | pivot axes |
| 46a-46c | Feet magnets |
| 47a-47g | Mouse magnets |
| 48 | cradle foot extension |
| 49 | mouse cable |
| 50 | edge of palm rest |

FIGS. 1-12 show a computer mouse (1) according to one embodiment of the present invention.

Figure 13:
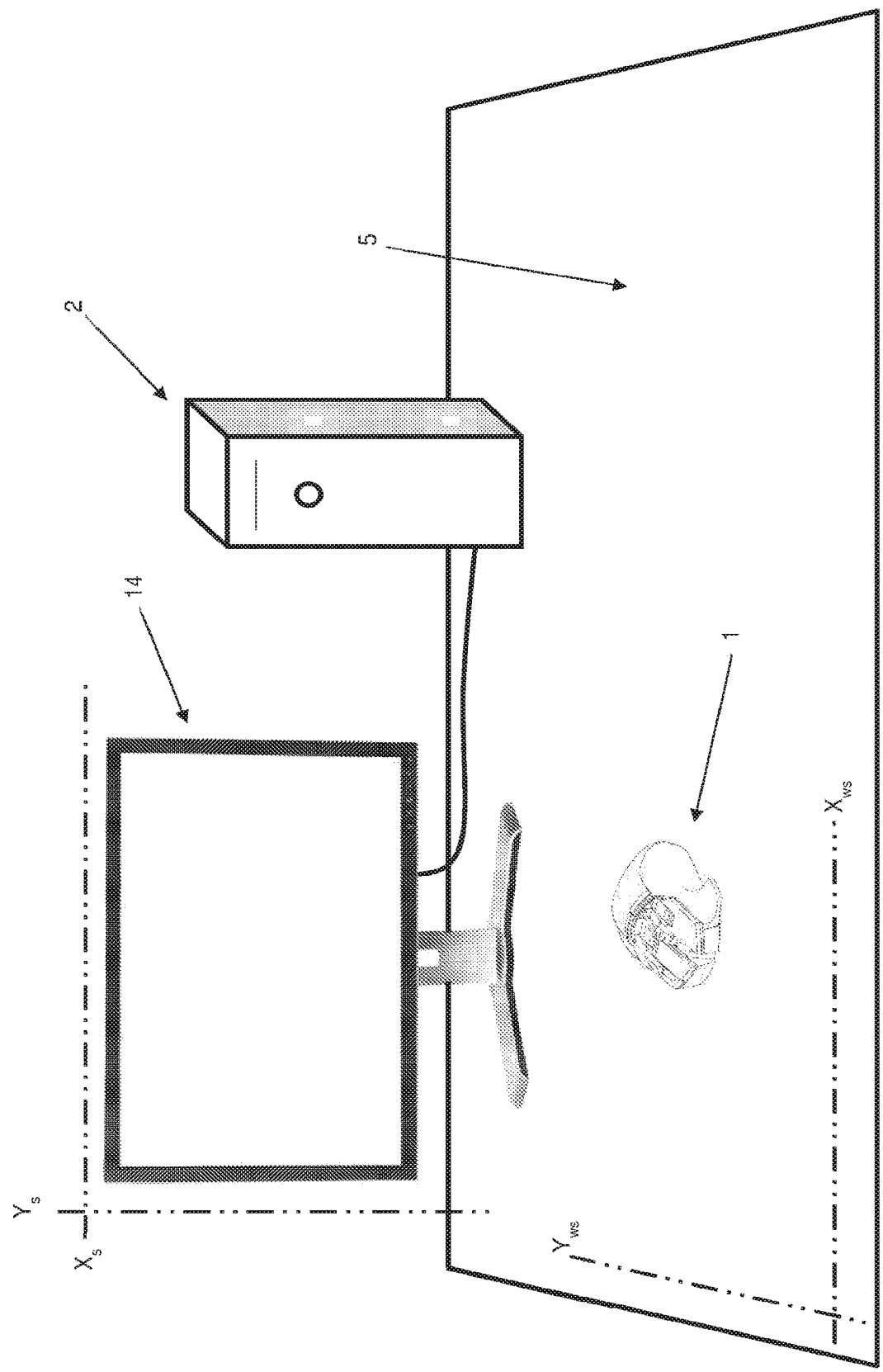
FIG. 13 shows a computer, display screen and work surface for use with the mouse of FIGS. 1-12.

The mouse (1) is connectable to a desktop or notebook computer, (2) (see FIG. 13) either corded or wirelessly. The examples herein will be made to use of the mouse with a desktop or notebook computer. However, the mouse may be connectable to desktops, laptops, tablets, car infotainment systems, smartphones, notebook computers, televisions, games consoles, navigation systems, augmented reality systems or indeed any computer.

Figure 4:
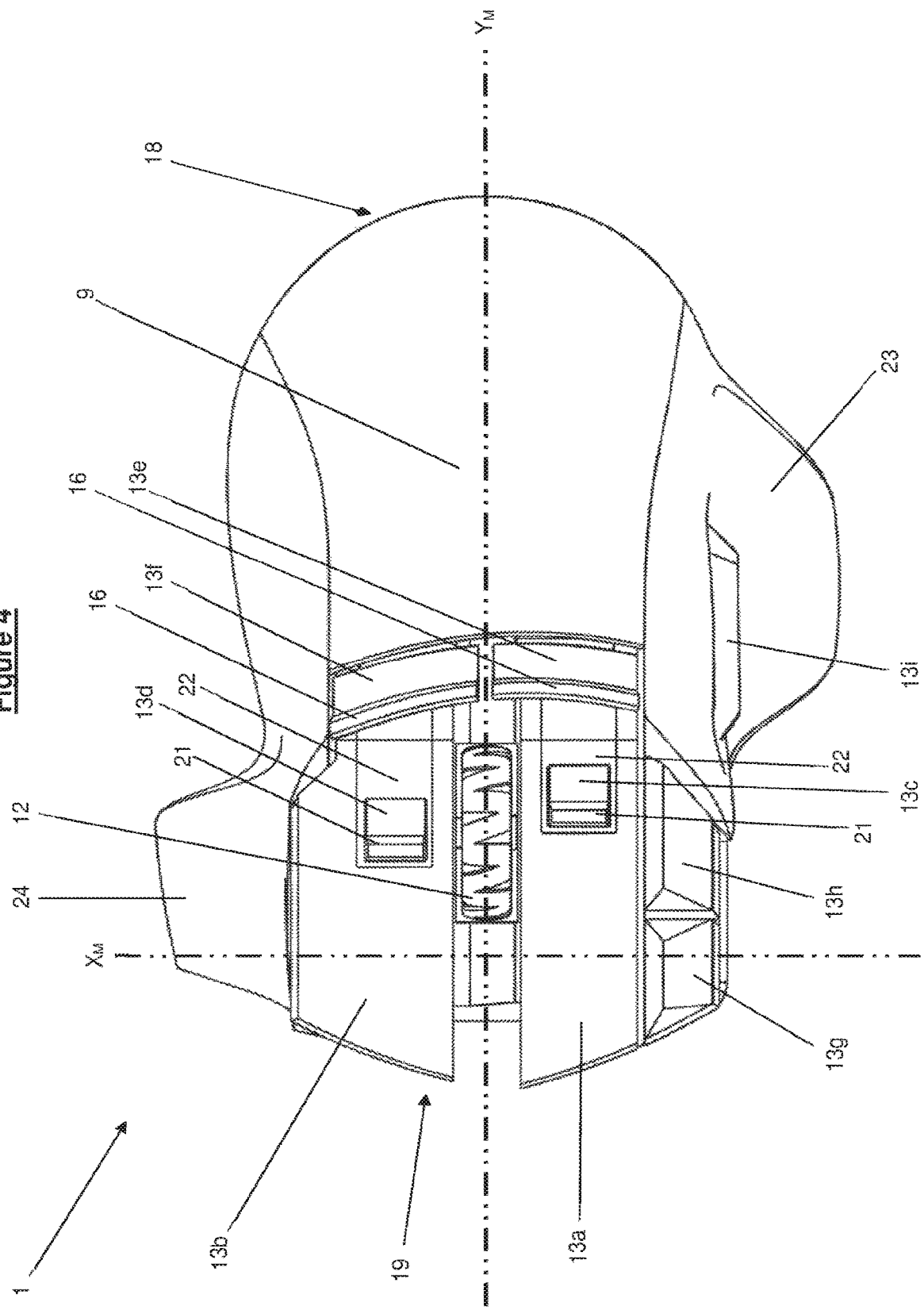
FIG. 4 shows a plan view of the computer mouse of FIGS. 1-3.
Figure 6:
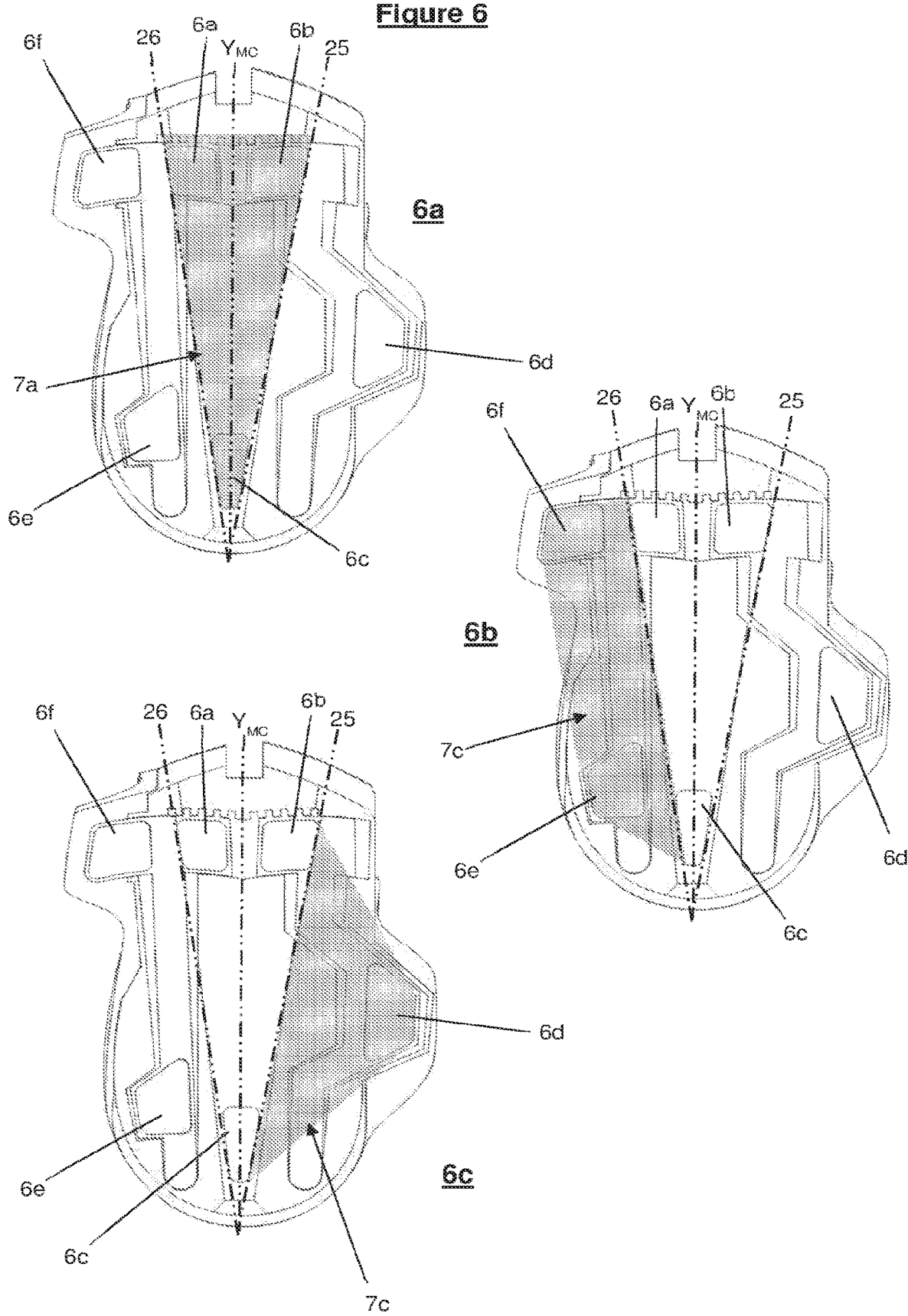
FIG. 6a shows the underside of the mouse of FIGS. 1-5 and the first base contact footprint.
FIG. 6b shows the underside of the mouse of FIGS. 1-5 and the second base contact footprint.
FIG. 6c shows the underside of the mouse of FIGS. 1-5 and the third base contact footprint.

The mouse (1) has a body including a lower base (3) portion with a lower surface (4) configured for sliding across a planar, substantially horizontal work surface (5), e.g. a desk, table or other surface. The lower surface (4) has a plurality of supporting projections (6) (hereinafter "contact feet") with lowermost portions for contacting the work surface (5). Feet (6a, 6b 6c) collectively form a first base contact footprint (7a) lying in a first base contact plane (20a). The contact feet (6) are provided to support the mouse (1) in a stable orientation while minimising friction as the mouse (1) moves over the work surface (5). The contact feet (6) are thus shaped, sized and arranged accordingly to balance these two functions The mouse (1) in these embodiments is elongate along a longitudinal axis ($Y_M$) with respect to an orthogonal lateral axis ($X_M$) as shown in FIG. 4. The example mouse shown in the drawings is a right-handed mouse and it will be appreciated a left-handed mouse may be created as a mirror image about a central longitudinal axis.

An upper body (8) extends upwards from the base (3) and has a palm-rest (9) extending forwards from the rear (16) of the mouse (1). The mouse (1) has a thumb-engaging surface (10) on one lateral side and a finger-engaging surface (11) on the opposite lateral side. The finger-engaging surface (11) is shaped and positioned to allow the user to place a ring and/or little finger on it with the thumb on the opposite side of the mouse (1).

The mouse (1) has a plurality of contact sensors provided in the form of clickable buttons (13). These include buttons:
13a, located to lie beneath a user's index fingertip (38) at the front (17) of the mouse (1);
13b located to lie beneath the user's middle fingertip (38);
13c located to lie immediately adjacent and rearward of the user's index fingertip (38);
13d located to lie sit immediately adjacent and rearward of the user's middle fingertip (38);
13e, hereinafter left "trigger button" or left "proximal phalange button," located to lie beneath the user's index finger proximal phalange (39);
13f, hereinafter right "trigger button" or right "proximal phalange button", located to lie beneath the user's middle finger proximal phalange (39);
13g, located to lie laterally leftward of the user's index finger (37);
13h, located to lie laterally leftward of the user's index finger (37) and rearward of button 13g;
13i located to lie adjacent a user's thumb;
13j located to lie adjacent a user's thumb and beneath button 13i;

The mouse also includes a scroll-wheel (12) with integrated button (13k).

In use, an operator manually holds the mouse (1) with their palm resting on palm-rest (9) and fingers extending forward with an index fingertip (38) to the left of scroll-wheel (12) forward of button (13c) and with the middle fingertip (38) to the right of scroll-wheel (12) and forward of button (13d). Reference herein, will be made to a user's hand in such a position being in a "neutral" state.

The buttons (13a-13k) are all configured to generate different signals when clicked or otherwise activated.

Reference herein is made to buttons and movement sensor systems being "activated" and "deactivated" to refer to the state of a button (or the like) being actuated or turned on (activated) and then released to return to its original state (deactivated). It should be understood that this reference is to describe two alternative states or functions of the component and should not be interpreted as limiting activation/deactivated to two states, e.g. on and off or input 0 or 1.

To aid clarity, we herein define the base (3) as being the portion of the mouse (1) below the finger-engaging surfaces (10 and 11), The base (3) is thus demarcated from the upper body (8) by a mutual boundary extending about the lateral periphery of the mouse (1) at the lower edges of the finger-engaging surfaces (10, 11). The finger-engaging surfaces (10 and 11) are thus defined as part of the upper body (8). The buttons (13a-13k) are also positioned on the upper body (8) while the scroll wheel (12) is typically mounted with the rotation axis through the upper body (8). It will be appreciated that the mouse base (3) and upper body (8) may be formed as separate joinable components, formed as a unitary body or formed from multiple components. Reference herein is made to separate components for clarity, though this should not be seen as limiting.

Figure 14:
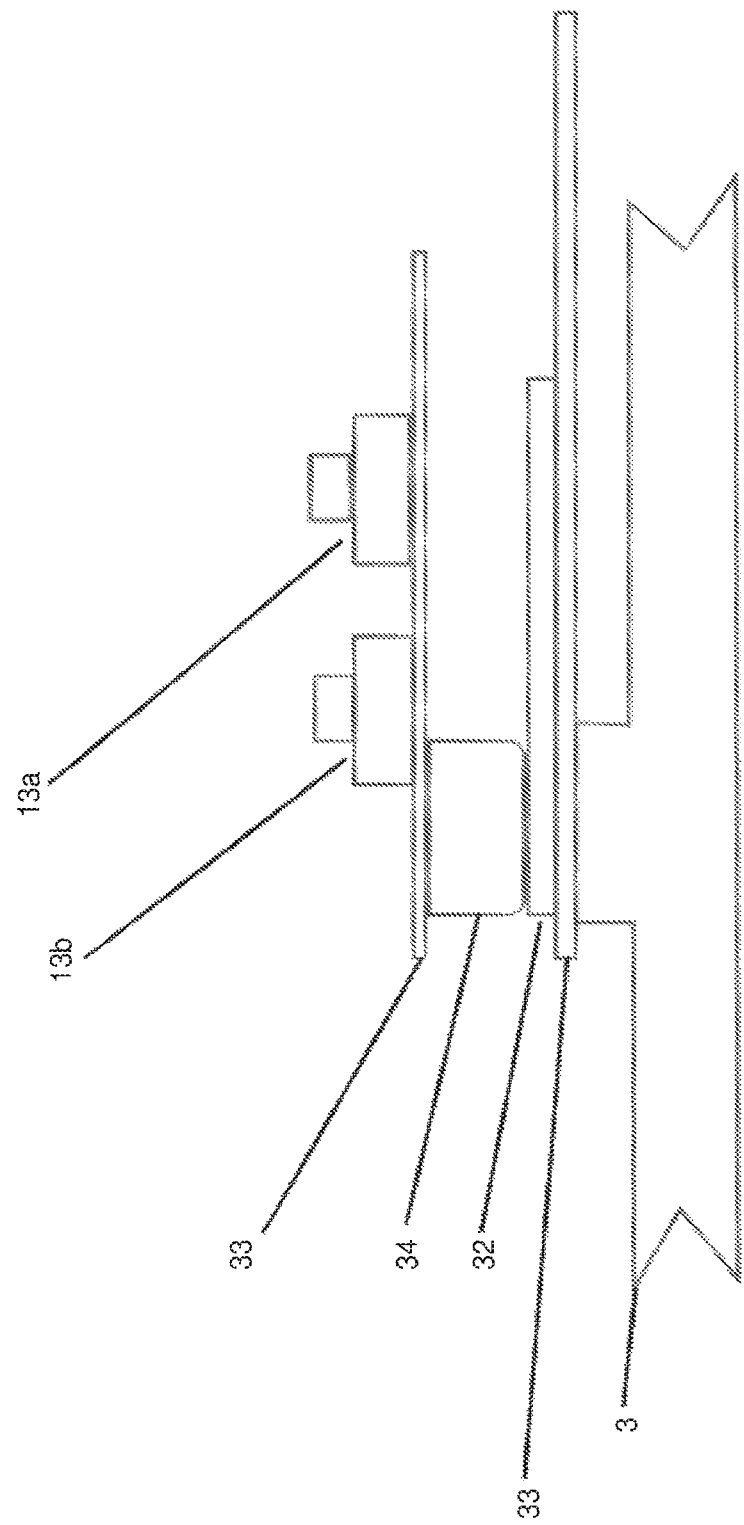
FIG. 14 shows a schematic diagram of button and pressure sensor assembly.

Buttons 13a and 13b are typically configured as 'primary buttons' to provide conventional left and right click signals when depressed. Buttons 13a and 13b are also coupled to a force transducer/pressure sensor (32) as shown in FIG. 14 to provide additional configurable functionality. When a button 13a or 13b is depressed the force transducer (32) produces a data signal indicative of the force applied. This force data signal can then be interpreted by a computer as an analogue or variable input. The force transducer data received by the computer (2) is converted into commands by comparing the indicated force level with predetermined ranges bound by threshold force values, indicating different commands, e.g. range 1 may be between 10 and 30% indicating command No. 1 should be made, range 2 may be between 30% and 60% indicating command No. 2 should be made.

This "deep clicking" of buttons (13a, 13b) provides an intuitive additional input method for the computer (2) over solely a button click as provided on conventional computer mice.

In some embodiments, the computer is configured to provide at least one command to a computer application when the force sensor data indicates the force passes a predetermined threshold force value. The command may be a button press, keyboard key, key combination/macro or any other command. Driver software or the computer application may be configured to specify the command triggered by the button (13) and/or force value thresholds passed.

There are numerous ways in which the force transducer data may be utilised to provide commands for a computer application. The computer for example may be configured to provide a button, key or key combination when force transducer data passes the threshold force value and a release of the same button, key or key combination when the force transducer data subsequently passes the threshold force value. In this way the mouse button may use the force transducer as a means for providing a key/button press and hold which may be useful for example in activating a 'zoom-in' command in a computer game.

Alternatively, the computer command may include a press of a button, keyboard key or key combination when the force transducer data passes the threshold force value and a second press of the same button, key or key combination when the force transducer data subsequently passes the threshold force value, thus acting as a 'toggle' for example toggling run/walk in a computer game.

Another configuration may have the computer configured to provide a variable input to a computer application, the variable input corresponding to the force transducer data, e.g. the degree of force applied to the button (13) may be interpreted as an 'acceleration' command in a computer game, the amount of acceleration corresponding to the force.

As shown in FIG. 14, both buttons (13a) and (13b) are mounted to a rigid Printed Circuit Board (PCB) (33) spaced from the pressure sensor (32) by spacer (34). Pressure sensor (32) is mounted on a PCB (35) and electrically connected thereto. The base (3) supports the PCB (35).

When a button (13a, 13b) is pressed a button signal is generated indicating which button (13a or 13b) was pressed. An independent signal indicative of the force applied to pressure sensor (32) is also generated. The force applied by a particular button can thus be determined.

The fingertip buttons (13c) and (13d) are coupled to another force transducer (not shown) similar to force transducer (32) to provide similar 'deep click' functionality as described above.

Similarly the scroll wheel (12) has an integral button also coupled to a force transducer (not shown) similar to force transducer (32) to provide similar 'deep click' functionality.

FIG. 15 shows a screenshot of an exemplary text document and application for the 'deep-click' button functionality. The computer and mouse (1) are configured such that:
- a left-click of button (13a) places a cursor at a position in the text;
- the button (13a) is pressed a distance or with a force greater than a first predetermined threshold level and the nearest word is selected as shown in FIG. 15a, such as would be implemented using a conventional mouse by double-clicking;
- Button (13a) is pressed a distance or with a force greater than a second predetermined threshold level (greater than the first) and the entire line or sentence is selected as shown in FIG. 15b;
- Button (13a) is pressed a distance or with a force greater than a third predetermined threshold level (greater than the second) and the entire paragraph is selected as shown in FIG. 15c, such as would be implemented using a conventional mouse by triple-clicking;
- Button (13a) is pressed a distance or with a force greater than a fourth predetermined threshold level (greater than the third) and the entire document is selected, such as would be implemented conventionally using a keyboard command CTRL+A.

In this example, the computer (2) is configured to interpret four threshold levels of force as different commands. It will be appreciated that any number of threshold force levels may be set to provide varying commands to the computer or software applications.

The mouse (1) has a physical feedback module provided in the form of a vibratory motor (not shown) or similar.

The vibratory motor can be configured to activate in response to any user interaction with the mouse (1). However, the physical feedback is most valuable in indicating to a user that they have reached a threshold level in an analogue input, such as rotation or acceleration or deep clicking of a button. In the embodiment shown in the drawings the vibratory motor is configured to vibrate each time one of the buttons (13a-13d) is pushed downwards past a predetermined threshold level of force.

The vibratory motor is also configured to vibrate in response to threshold levels of rotation, acceleration and translation of the mouse (1).

The position of buttons (13c) and (13d) are adjustable longitudinally with respect to the upper body (8). The buttons (13c) and 1(3d) are attachable to the mouse in a plurality of longitudinal positions with respect to the mouse upper body (8). Each button (13c) and (13d) has a protrusion interlockable at various positions in a corresponding channel (22) in the mouse upper body (8). Hand-size varies amongst users and thus it is advantageous to provide positional adjustability of the fingertip buttons (13c, 13d).

The fingertip button (13d) is capable of being attached at a location further forward than button (13c) to locate the button (13d) closer to a user's middle fingertip as a human's middle finger is typically longer than that of their index finger.

Each button (13c, 13d) has a laterally extending ridge (21) toward the front which assists a user in pushing the button (13c, 13d) forwards or pulling a button (13c, 13d) backwards.

Buttons (13c) and (13d) are bidirectional buttons, generating different signals depending on which direction the button is moved, either forwards or backwards. FIG. 9a shows a user's middle finger (37) hovering over right click button (13b) and FIG. 9b shows the middle finger (37) curled back so that the middle fingertip (38) is on button (13d) rearward of the button's ridge (21) ready to push the button (13d) downward.

The buttons (13c) and (13d) may alternatively include corresponding rocker switches, configured to pivot about laterally extending axes such that they may be activated by either pressing on forward or rearward portions of a button (13c) or (13d).

The upper body (8) is shaped with an upper surface having a contour extending longitudinally forward from the mouse rear (18) over the palm-rest (9) through a vertical step

(31) (with respect to $Z_m$ axis) to the forward portion (19) of the mouse (1). The vertical step (31) between a forward-most portion of the palm rest (9) and forward buttons (13a, 13b) provides a void below a virtual reference line ($V_1$) drawn from the forward-most portion of the palm rest (9) and a forward portion of the forward buttons (13a, 13b). The buttons (13e, 13f) are located at the forward-most portion of the palm rest (9).

The discontinuity provided by the step (31) enables the buttons (13a, 13b, 13c, 13d) to be orientated at a far shallower inclination than would be possible if they were aligned along a continuous contour to the raised palm-rest. Thus, the user gains the ergonomic benefit of using a palm-rest while having low-inclination buttons providing improved stability when pressing, particularly when using the 'deep click' functions described above.

Recesses (14) are formed underneath the trigger buttons (13e,13f) and at least partially formed by the undersides of the trigger buttons (13e, 13f). Each recess (14) is located below, with respect to the $Z_M$ axis, the virtual reference line ($V_1$) drawn from the forward-most portion of the palm rest (9) and the primary buttons (13a, 13b). Portions of at each trigger button (13e, 13f) extend above the virtual reference line ($V_1$).

The recesses (14) are also located below a second virtual reference line ($V_2$) drawn from the forward-most portion of the palm rest (9) to the scroll wheel (12).

The trigger buttons (13e) and (13f) are also bidirectional buttons, generating different signals depending on which direction the button (13e, 13f) is moved, either:
downwards and forwards as shown in FIG. 10b, or
upwards and backwards as shown in FIG. 11b.
Both directions that the trigger buttons (13e, 13f) are moved in have a $Z_M$ component.

As previously discussed, it will be understood that when operating the mouse (1) whilst tilted, the mouse stability provided by the work surface (5) is reduced, particularly when the mouse (1) contacts the work surface (5) solely via a single pivot point/pivot axis ((25, 26), the positional stability and accuracy of the mouse (1) is dependent on the user's manual stability and composure whilst multi-tasking physical activities.

Positional precision is axiomatically compromised when the stability of the mouse is reduced, and is therefore an inherent side-effect of tilting the mouse (1). As will be easily understood, the force of a user's finger (37) pushing downwards (i.e negative $Z_M$ axis) to click, say, a primary button (13a) whilst the mouse (1) is inclined is not counteracted by the resistance of the work surface (5). The user must thus stabilise the $X_M$, $Y_M$, $Z_M$ axis position and angular tilt orientation solely through the grasp of their other fingers.

Each recess (14) of each trigger button (13e, 13f) enables the user to provide a trigger button (13e, 13f) input by placing a fingertip (38) placed in the recess (14) under a trigger button (13e, 13f), thereafter pulling their finger towards the inner surface of their palm. The direction of force C applied by the user on the trigger button is thus at least partially upwards and/or rearwards (i.e with a positive $Z_M$ and/or negative $Y_M$ component) of the mouse (1). The motion of pulling the trigger button (13e, 13f) mirrors the intuitive trigger pulling action familiar to most users.

The location of the user's palm (not shown) on the palm rest (9) during the action of pulling the trigger button (13e, 13f) provides a stabilizing platform to counteract deviations caused by the trigger button (13e, 13f) operation. Moreover, the stabilisation provided by allowing the force of pulling the trigger button (13e, 13f) actuation to be at least partially counterbalanced by the user's palm (not shown) is applicable at any tilt or pitch inclination, and irrespective of dynamic $X_M$, $Y_M$, movements.

Each trigger button (13e, 13f) has a laterally extending ridge (19) toward the front which assists a user in pushing the trigger button (13e, 13f) downwards.

Figure 17:
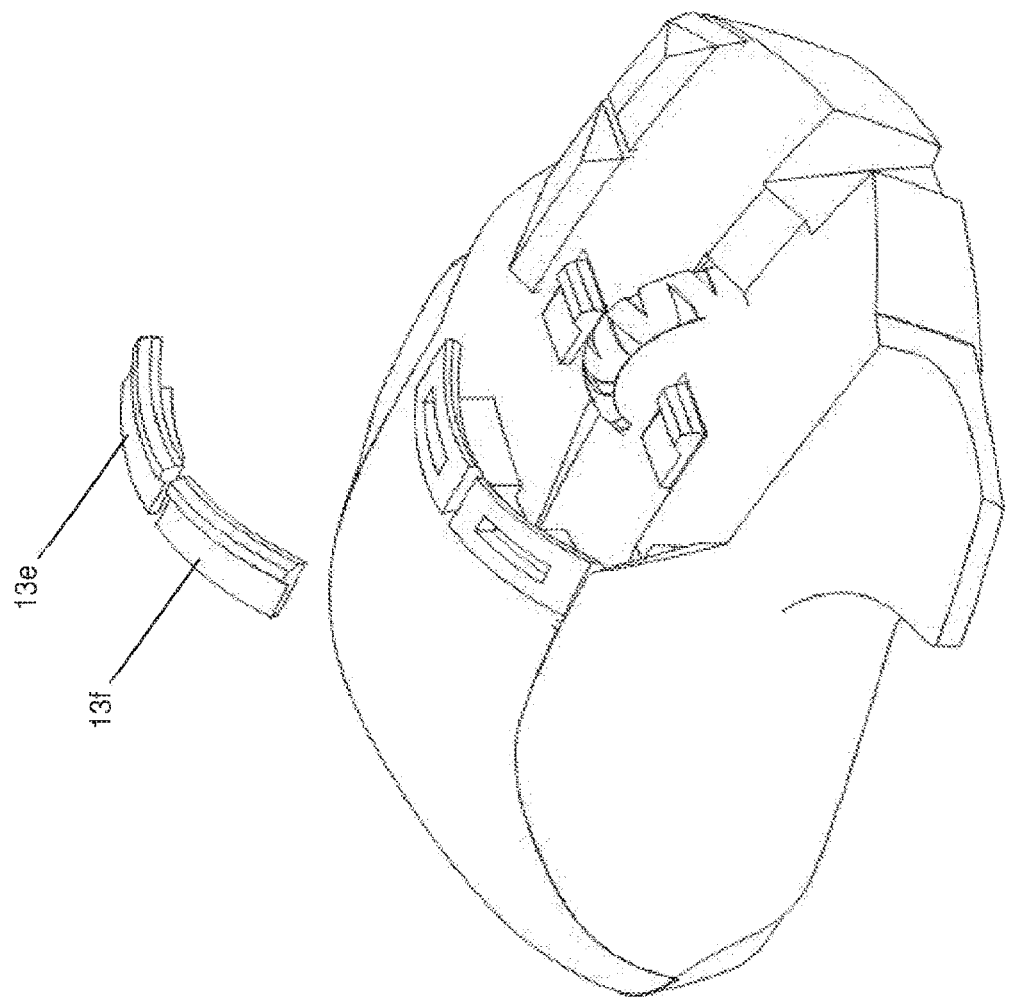
FIG. 17 shows the mouse of FIGS. 1-12 with detached buttons.

The buttons (13e) and (13f) also have detachable caps as shown in FIG. 17 replaceable with thicker or thinner caps or higher or lower ridges (19) to respectively raise and or lower the upper surface of buttons (13e, 13f) to suit a user's requirements.

The buttons (13e, 13f) may have detachable caps or the entire buttons may be detachable.

As shown in FIG. 10b, a user is able to activate a button (13e, 13f) by straightening their finger (37) causing the pad of the proximal phalange (39) to contact the ridge (19) of the button (13e or 13f) and press down the button (13e or 13f). Thus, each trigger button (13e, 13f) and corresponding primary button (13a, 13b) are respectively operable by pressing a proximal phalange (39) and a fingertip (38) of a single common finger. A user is thereby not required to laterally move their finger (37) or curl their finger (37) backwards in order to activate the buttons (13e, 13f) which cannot be performed as rapidly as a finger extension. The buttons (13e, 13f) are thus particularly suited for use in applications such as computer games that benefit from rapidly available additional mouse functionality.

The buttons (13e) and (13f) are also detachable and replaceable (by the user, retailer and/or manufacturer) to change the thickness, length, shape or height of the ridges. This adjustability enables a user to for example to use a thicker button to raise the upper surface to make it easier to press down with the pad of a proximal phalange.

A configuration display screen (41) is located forward of the thumb-engaging surface (10) on the left side of the mouse (1). The display screen (41) can be used to display configuration information, of the mouse or any other information, images or data required by the user. It is particularly useful in displaying the force transducer data and orientation sensor data so that the user can determine the orientation or force thresholds they wish to use in providing commands for the computer applications.

The embodiments illustrated in FIGS. 1-13 further include a movement sensor system provided in the form of an optical movement sensor system (15) capable of detecting relative movement between the mouse (1) and work surface (5).

The optical movement sensor system (15) includes a light source configured to illuminate the work surface (5) and an image sensor configured to receive reflected light from the work surface (5) to capture an image of the work surface (5). An image processing chip compares successive captured images to determine the direction and degree of device movement. The image sensor may be of a known type such as an active pixel sensor imager CMOS type. Such optical sensors are known for use with computer mice and are typically used in conjunction with an LED or laser light source that illuminates the supporting surface sufficiently for optical detection of mouse movement. The LED, laser or other light source is located in the base (3) and the light therefrom is directed to illuminate the area below the optical system (15).

The relative movement over a support surface as detected by the optical movement sensor system (15) may be used to generate movement data signals to be passed to the computer (2) to instruct the computer to display movement of an on-screen GUI element such as an on-screen mouse pointer.

The movement data signals, position data signals, button signals and scroll-wheel data signals generated by the mouse may be transmitted to the host computer (2) by a communication system using any convenient electrical transmission means and in preferred embodiments includes a USB cable or wireless Radio Frequency (RF) chip capable of supporting both Bluetooth™ and USB wireless standards. The use of both Bluetooth and USB wireless protocols allows the mouse (1) to be used with computers only having Bluetooth capability as well as those without Bluetooth capability but capable of accepting a USB receiver. The USB receiver is preferably a micro-USB receiver for improved compatibility with mobile devices which increasingly use micro-USB as a standard interface, though of course any suitable connector may be used. The mouse (1) includes internal control circuitry including a Printed Circuit Board (PCB) and a non-volatile memory (not shown). The memory stores configuration data relating to operational modes, button configurations and any other component configurations, e.g. for the buttons, scroll-wheel, image sensor, communication protocols, display screen (41) and the like.

Lifting the mouse (1) a sufficient distance from the work surface (5) such that it loses focus and can no longer determine movement can also be used as an input to the computer. The mouse (1) may be configured to pass a 'no-focus' signal to the computer when the optical sensor (15) loses focus or alternatively, the computer may be configured to operate differently when the mouse (1) is no longer providing movement information from the optical sensor. In one example, when the optical sensor (15) loses focus the computer (2) is configured to use the mouse orientation and acceleration as directional inputs, e.g. for cursor movement.

The mouse (1) lower surface (4) includes six contact feet (6a-6f) extending from the lower surface (4) for contacting the work surface (5). As shown best in FIG. 6a, the lowermost periphery of the contact feet (6a, 6b and 6c) form the first base contact footprint (7a) as represented by the shaded region. The first base contact footprint lies in the first base contact plane (20a).

The lateral boundaries of the first base contact footprint (7a) form 'pivot axes' (25 and 26) about which the mouse (1) may rotate when altering orientation to tilt the mouse (1).

The outermost lateral edge of contact feet (6a and 6c) act as pivot points and form 'pivot axis' (26) when tilting the mouse (1) to the right.

Similarly, the outermost lateral edges of contact feet (6b and 6c) act as pivot points and form 'pivot axis' (25) about which the mouse (1) when tilting the mouse (1) to the left.

FIG. 6b shows a second base contact footprint (7b) formed from the lowermost periphery of the edges of contact feet (6b and 6c) and lateral contact foot (6d).

FIG. 6c shows a third base contact footprint (7c) formed from the lowermost periphery of the edges of contact feet (6b and 6c) and lateral contact feet (6e and 6f).

With respect to FIGS. 5c and 6c the mouse may be rotated about the left pivot axis (25) to tilt the mouse (1) to the left until lateral contact foot (6d) contacts the work surface (5). The third base contact footprint (7c) then supporting the mouse on the work surface (5) and the first (20a) and second (20b) base contact planes inclined relative to the work surface (5).

Conversely, as shown in FIGS. 5b and 6b, rotating the mouse (1) to the right about pivot axis (26) until lateral contact feet (6e, 6f) contact work surface (5) results in the second base contact footprint (7b) supporting the mouse (1) on the work surface (5) with the first (20a) and third (20c) base contact planes inclined relative to the work surface (5).

Both pivot axes (25, 26) are divergent from the longitudinal $Y_M$ axis of the mouse (1) and also mutually divergent. At the forward part of mouse (1) the pivot axes (25, 26) are thus at their maximum separation from each other, tapering to an intersection/origin at the rear of the mouse (1).

Two pivot axes (25, 26) enable the mouse to tilt the first base contact footprint (7a) away from the work surface (5) in two directions, providing the potential for additional functionality over a single tilt direction.

The optical sensor (15) is located at the rear of the mouse (1), near where the pivot axes (25, 26) are closest to the central axis ($Y_M$) and thus the distance of each pivot axis (25, 26) to the optical sensor (15) is close to minimised. This configuration ensures the distance between the work surface (5) and optical sensor (15) is minimised.

The mouse (1) is configurable to operate in multiple different modes depending on the orientation of the mouse and the buttons (13a-13k) that are pressed. In the embodiment shown in FIGS. 1-13 the mouse (1) is configured to operate in a first "pointer" mode when in a first orientation (see FIG. 5a) with the first base contact footprint (7a) in contact with the work surface (5) and first base contact plane (20a) parallel with the work surface (5).

The mouse (1) may thus be tilted as per FIG. 5b, or 5c to operate in different modes to that of the 'pointer' mode as shown in FIG. 5a. It will be appreciated numerous modes may be available and can be configured via software on the computer. For example, in one mode with the mouse (1) tilted to the right as per FIG. 5b the mouse (1) movements and button presses may be interpreted by the computer (2) as touch inputs. In another mode, the mouse (1) may enter a "digital ink" mode or similar, the mouse movements being interpreted as a virtual drawing tool movement.

The tilt of the mouse about the pivot axes (25, 26) may also be used as another input to the computer, e.g. the tilt left or right may respectively be configured to provide "Q" and "E" keypresses to the computer (2). "Q" and "E" are typically assigned as a "lean left" or "lean right" commands in a First Person Shooter (FPS) game and thus tilting the mouse left and right provides an analogous and intuitive input method for the user.

The tilt of the mouse about the pivot axes (25, 26) may also be used to provide an analogue input to the computer, e.g. providing roll inputs to a flight simulator.

The mouse (1) includes a mode sensor provided as an orientation sensor in the form of a microchip (not shown) with a 3-axis gyroscope and 3-axis accelerometer and on-board Digital Motion Processor (DMP). The microchip is capable of determining rotation of the mouse with respect to three axes ($X_M$, $Y_M$, $Z_M$) and acceleration with respect to these three axes ($X_M$, $Y_M$, $Z_M$) and outputting one or more signals indicative of the magnitude and direction of the rotation and acceleration.

The mouse (1) thus provides eight-dimensional movement data using both the orientation sensor and optical sensor, including three axes of acceleration, three axes of rotation and the two axes of translation provided by the optical sensor.

Although the mouse (1) may be slid across the work surface and/or rotated about the $Z_{WS}$ axis whilst solely in contact with contact feet (6a and 6c) or (6b and 6c) of a single pivot axis (25 or 26), the stability is diminished. In contrast, by allowing the mouse (1) to be tilted sufficiently to also rest on the lateral contact feet (6d, 6e, 6f) of the second (7*b*) or third (7*c*) base contact footprint, the stability is greatly increased for position and button actuation manipulation.

It is undesirable for the user to accidentally tilt the mouse (1) when clicking a button (13*a*-13*k*) on the mouse upper (8). The stability of the mouse (1) is defined by the distribution of the contact feet (6*a*-*f*) forming each base contact footprint (7*a*, 7*b*, 7*c*), a larger separation of feet (6*a*-6*f*) leading to greater stability but requiring more force to tilt the mouse (1). It is therefore advantageous to provide the user with some adjustability to achieve a desired level of stability and ease of tilt.

Figure 7:
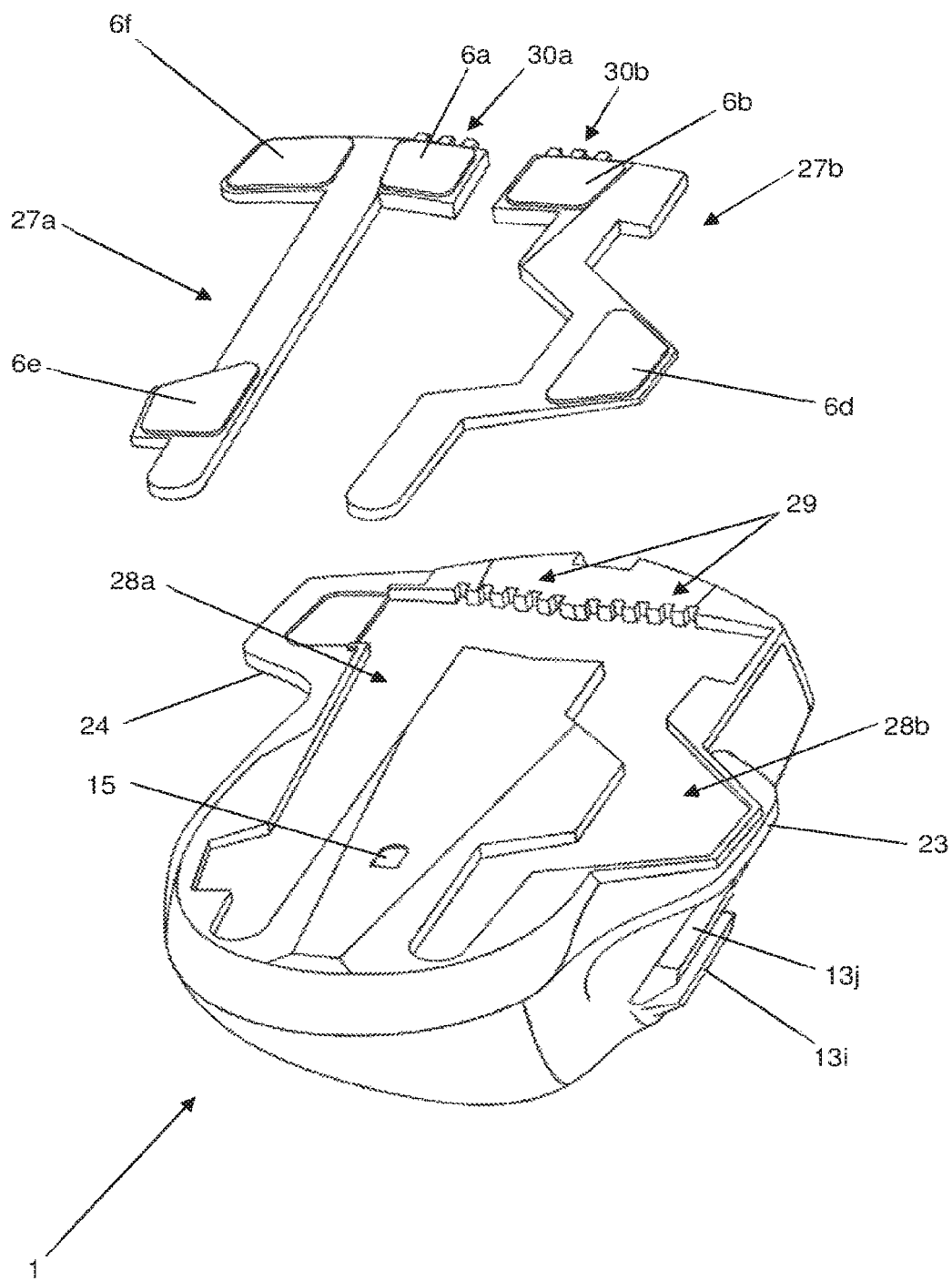
FIG. 7 is an underside view of the mouse of FIGS. 1-6 with detached linked feet assemblies.
Figure 8:
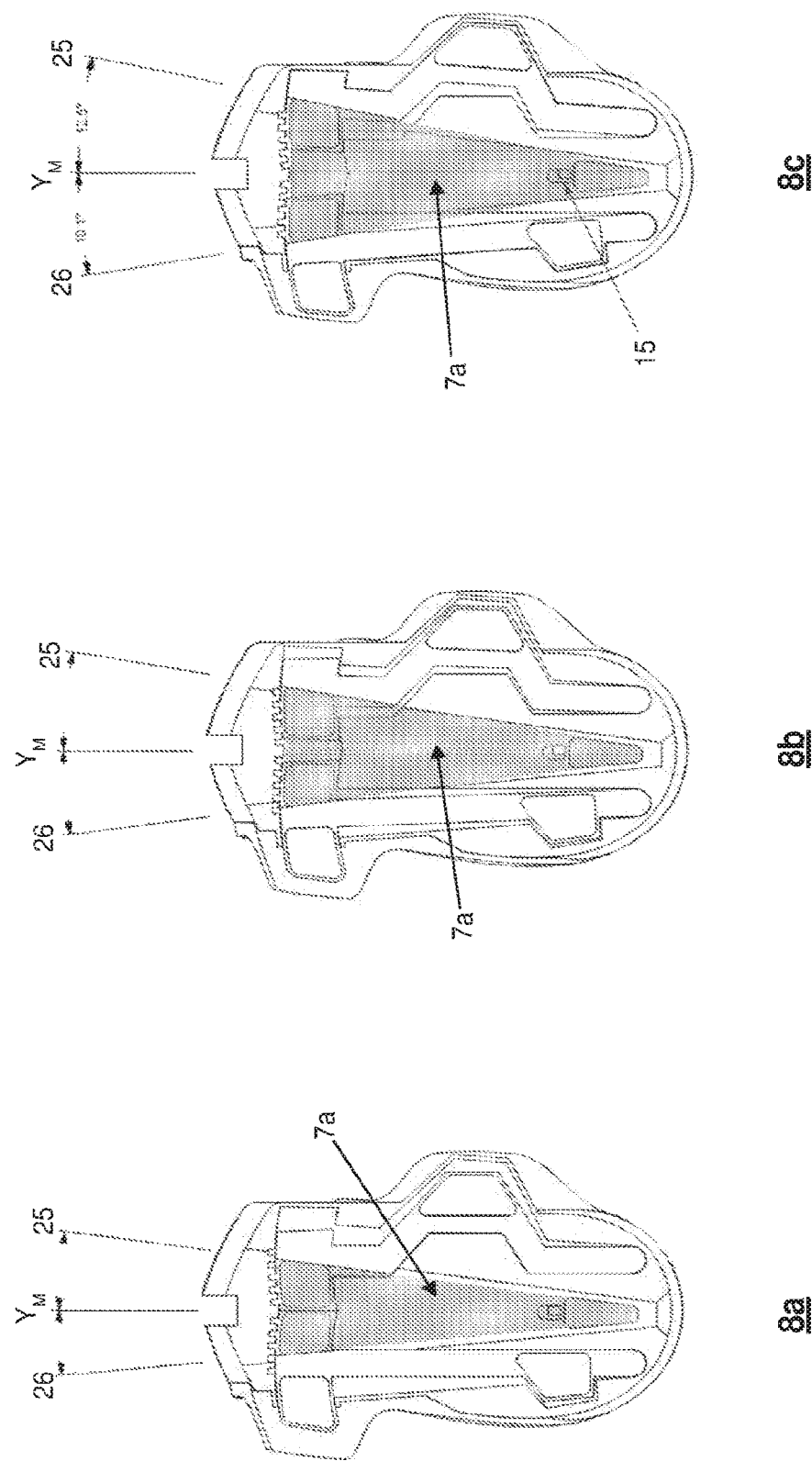
FIG. 8a shows the underside of the mouse of FIGS. 1-5 and the first base contact footprint.
FIG. 8b shows the underside of the mouse of FIG. 8a with an enlarged first base contact footprint.
FIG. 8c shows the underside of the mouse of FIG. 8b with an enlarged first base contact footprint.
Figure 9:
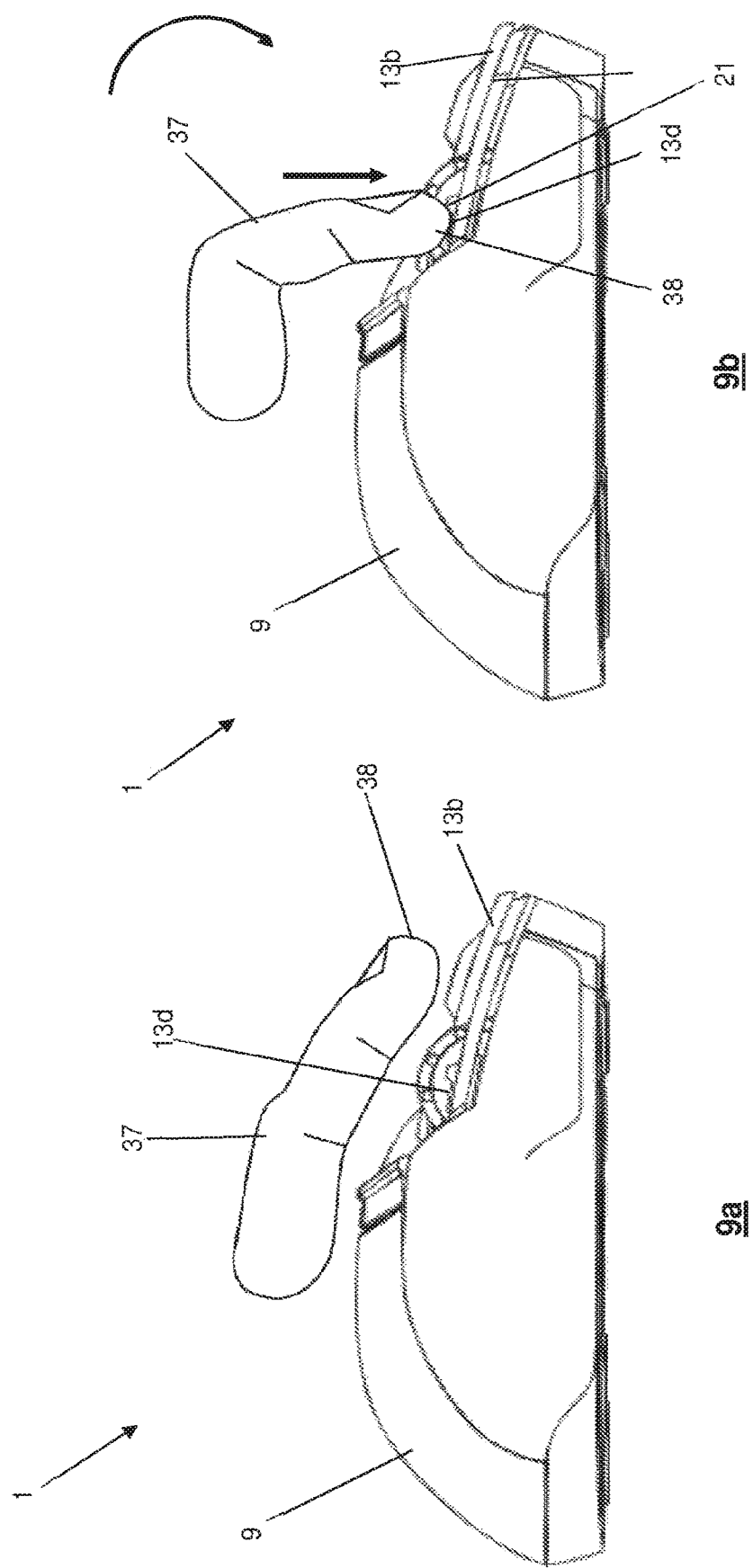
FIG. 9a shows a right side elevation of the mouse of FIGS. 1-8 with finger in a neutral position.
FIG. 9b shows a right side elevation of the mouse of FIG. 9a with finger in a curled position to activate a button.
Figure 10:
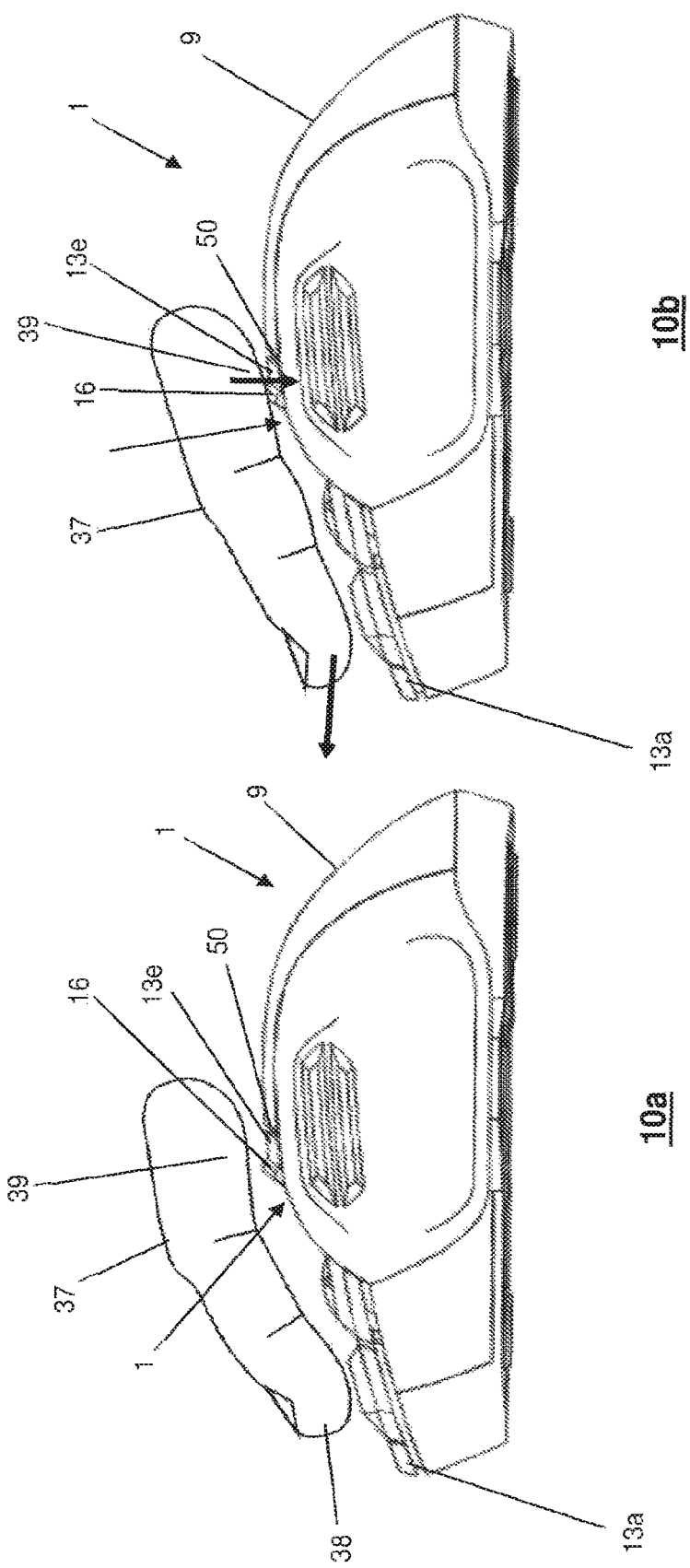
FIG. 10a shows a left side elevation of the mouse of FIGS. 1-9 with finger in a neutral position.
FIG. 10b shows a left side elevation of the mouse of FIG. 10a with finger in a straightened position to activate a button.
Figure 11:
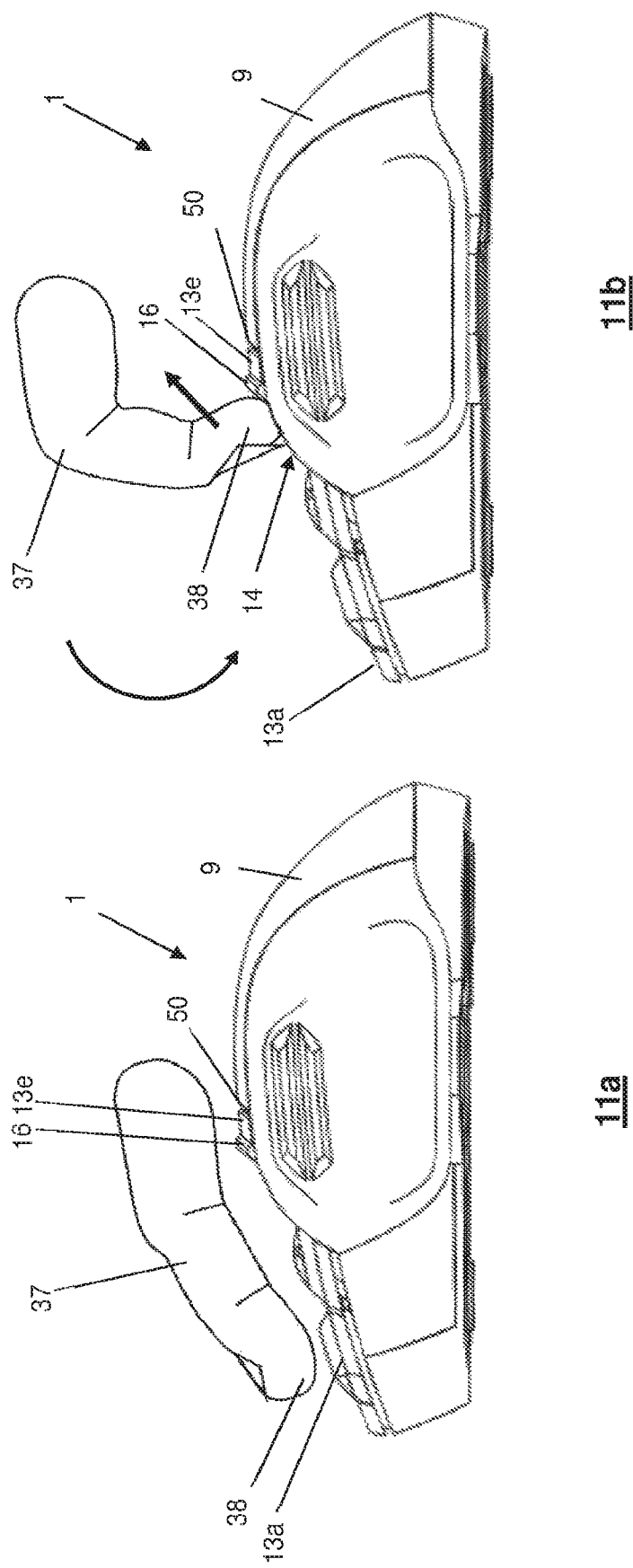
FIG. 11a shows a left side elevation of the mouse of FIGS. 1-10 with finger in a neutral position.
FIG. 11b shows a left side elevation of the mouse of FIG. 9a with finger in a curled position to activate a button.

As shown most clearly in FIGS. 7 and 8, the position of the contact feet (6*a*-6*f*) are adjustable to adjust the lateral separation of the contact feet (6*a* and 6*b*) to improve stability of the mouse.

The range of is laterally adjustable to increase the separation of the contact feet (6*a* and 6*b*) in the first base contact footprint (7*a*), thereby increasing the overall stability of the mouse (1) when in the first orientation with the first base contact footprint (7*a*) contacting the work surface (5).

The contact feet, (6*a*, 6*e* and 6*f*) are attached to a first detachable linked feet assembly (27*a*) that fits into a corresponding slot (28*a*) sized to be laterally larger than the linked feet assembly (27*a*) to allow lateral movement therein. A series of mating recesses (29) at the forward end of the slot (28*a*) mesh with corresponding teeth (30*a*) on the linked feet assembly (27*a*) to retain the linked feet assembly (27*a*) at a lateral position.

Similarly, a second detachable lined feet assembly (27*b*) includes feet (6*b* and 6*d*) and rests in slot (28*b*).

Each of the linked feet assemblies (27*a* 27*b*) include three teeth (30*a*, 30*b*) which mesh with three of the five recesses (29) enabling each linked feet assembly (27*a*, 27*b*) to be positioned in one of three lateral positions. The linked feet assemblies (27*a*, 27*b*) may be positioned asymmetrically although this may affect the overall balance of the mouse (1).

The position of the pivot axes (25, 26) relative to the central longitudinal $Y_{MC}$ axis and also the size of the first base contact footprint (7*a*) is adjusted through adjustment of the lateral positions of the linked feet assemblies (27*a*, 27*b*) in slots (28*a*, 28*b*).

The linked feet assemblies (27*a*, 27*b*) are magnetically coupled to the mouse (1) by incorporating magnets (not shown) that engage with corresponding magnets (47*a*-47*g*) in the mouse above the slots (28*a*, 28*b*) to magnetically retain the linked feet assemblies (27*a*, 27*b*) on the underside of the mouse (1) when lifted.

Including both a contact foot (6*a* or 6*b*) and the adjacent lateral feet (6*e*+6*f* or 6*d* respectively) on the linked feet assemblies (27*a*, 27*b*) ensures that the vertical and horizontal separation (and thus also the tilt rang*e*) between the pivot axes (25 or 26) and corresponding lateral contact feet (6*d* or 6*e*+6*f*) is constant. Thus, the maximum tilt angle of the mouse (1) is constant, regardless of the size of the first base contact footprint (7*a*). This constant tilt range ensures the computer (2) or mouse (1) does not need to determine the linked feet assembly lateral position.

FIG. 8*a* shows the linked feet assemblies (27*a*, 27*b*) in the centremost position with the minimum separation between the contact feet (6*a* and 6*b*). FIG. 8*b* shows the linked feet assemblies (27*a*, 27*b*) in a position with a larger separation between the contact feet (6*a* and 6*b*) than shown in FIG. 8*a* and FIG. 8*c* shows the linked feet assemblies (27*a*, 27*b*) in the laterally outermost positions with the maximum separation between the contact feet (6*a* and 6*b*).

As can be seen in FIG. 8, the divergence of the pivot axes (25, 26) from the longitudinal axis ($Y_{MC}$) is different, the axes (25, 26) diverging asymmetrically from the longitudinal axis ($Y_{MC}$). This asymmetric divergence is used to provide maximum stability for the uneven distribution of weight of the mouse (1) about the longitudinal axis ($Y_{MC}$) and typical force distribution over the mouse (1) due to a user's hand.

Figure 12:
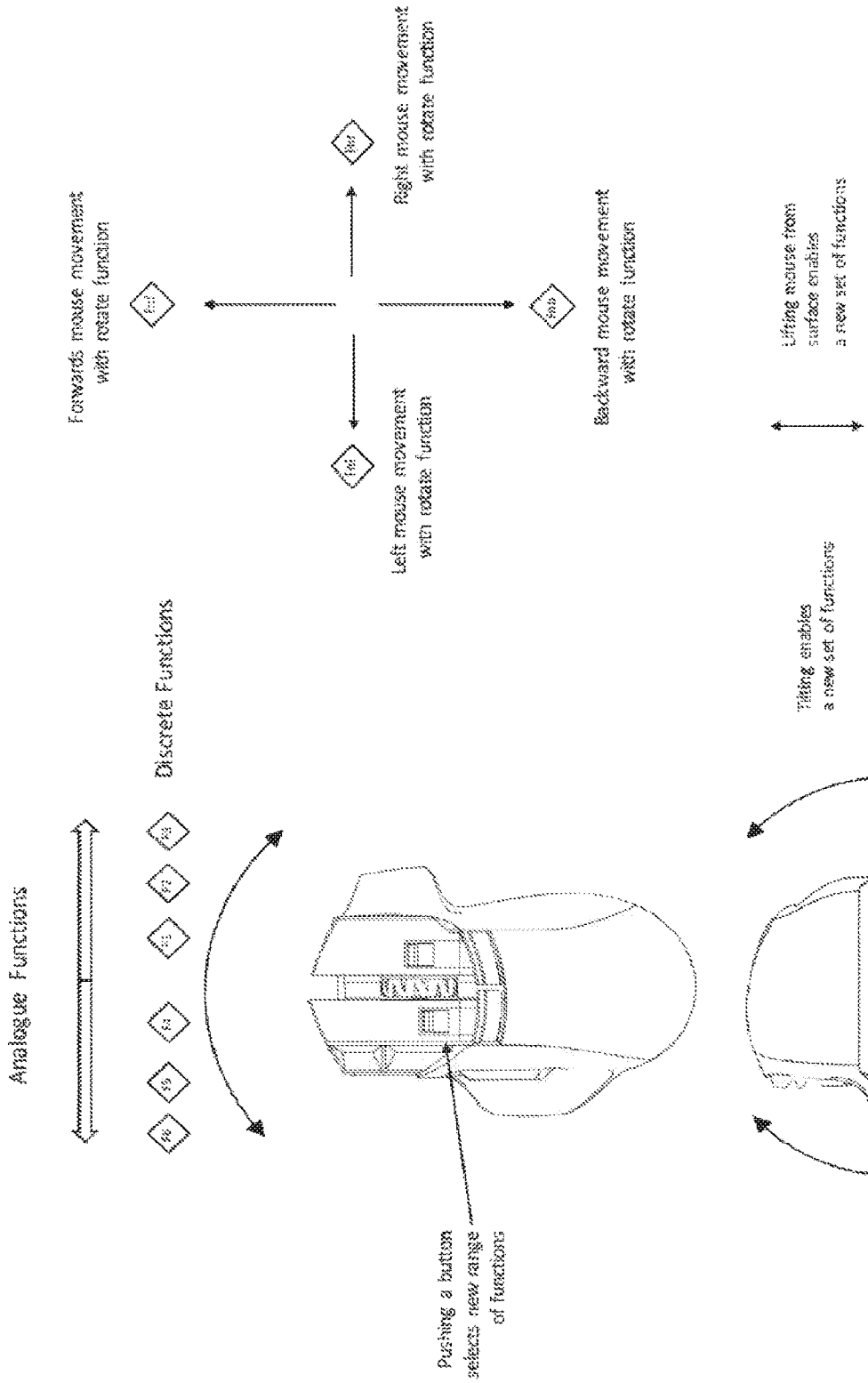
FIG. 12 shows a conceptual diagram of some of the potential functions of the mouse of FIGS. 1-11.

FIG. 12 shows a conceptual diagram of some of the mouse movements and actions that may be used to provide input signals to the computer (2). The mouse (1) offers a large number individual input signals that can be used independently or in combination to provide different inputs to the computer (2). The potential actions performable by the user to generate unique input signals for the computer (2) include:

| Discrete or digital inputs | Number of unique inputs |
| --- | --- |
| forward or downward clicks of buttons (13a-13k) | 11 |
| backward or upward clicks of buttons (13c-13f) | 4 |
| Tilt left or right | 2 |
| A typical four-level 'deep click' of buttons (13a-13d) | 16 |
| Lift mouse such that optical sensor loses focus | 1 |
| Yaw mouse, left or right, three angular thresholds | 6 |
| Scroll wheel rotation—two directions | 2 |
| Scroll wheel button | 1 |
| A typical four-level 'deep click' of scroll wheel | 4 |

| Analogue input | Number of unique inputs |
| --- | --- |
| Six axis motion sensor signal | 6 |
| Deep click buttons (13a-13d) | 4 |
| Scroll wheel—two directions of rotation and deep click | 3 |

Thus, it can be seen that combining these inputs can potentially provide up a myriad of combinations or individual input signals to the computer (2).

The mouse (1) may be configured in some applications to operate in a unit-increment mode wherein a given threshold distance of mouse movement is interpreted by the computer as movement of a mouse cursor or selected UI element by one unit of movement.

FIG. 16 shows an example of a user interface of image editing software. The cursor is movable conventionally when the mouse (1) is in a normal mousing mode with the first base contact footprint (7*a*) flat on work surface (5) and operates in a unit-increment mode when the mouse (1) is tilted to the right such that footprint B rests on the work surface (5). In this 'pixel' unit-increment mode the cursor moves one unit, i.e. a pixel, in response to a predetermined distance of movement of the mouse, e.g. 5 mm. Each dash on dashed line (36) represents one unit of movement, i.e. one pixel on the display and 5 mm leftward movement of the mouse (1).

The unit-increment mode may operate differently depending on what software is currently in focus on the computer (2). For example, on a spreadsheet software program, the incremental movement may be movement of the cursor or active UI element by a singular cell in response to the predetermined level of mouse movement. Similarly, in a text document the incremental movement may be movement of the cursor by one character or line. Thus, the user may provide precise and directional movement instructions to the computer (2) without requiring keyboard presses or manually difficult precise mouse movements.

Figure 18:
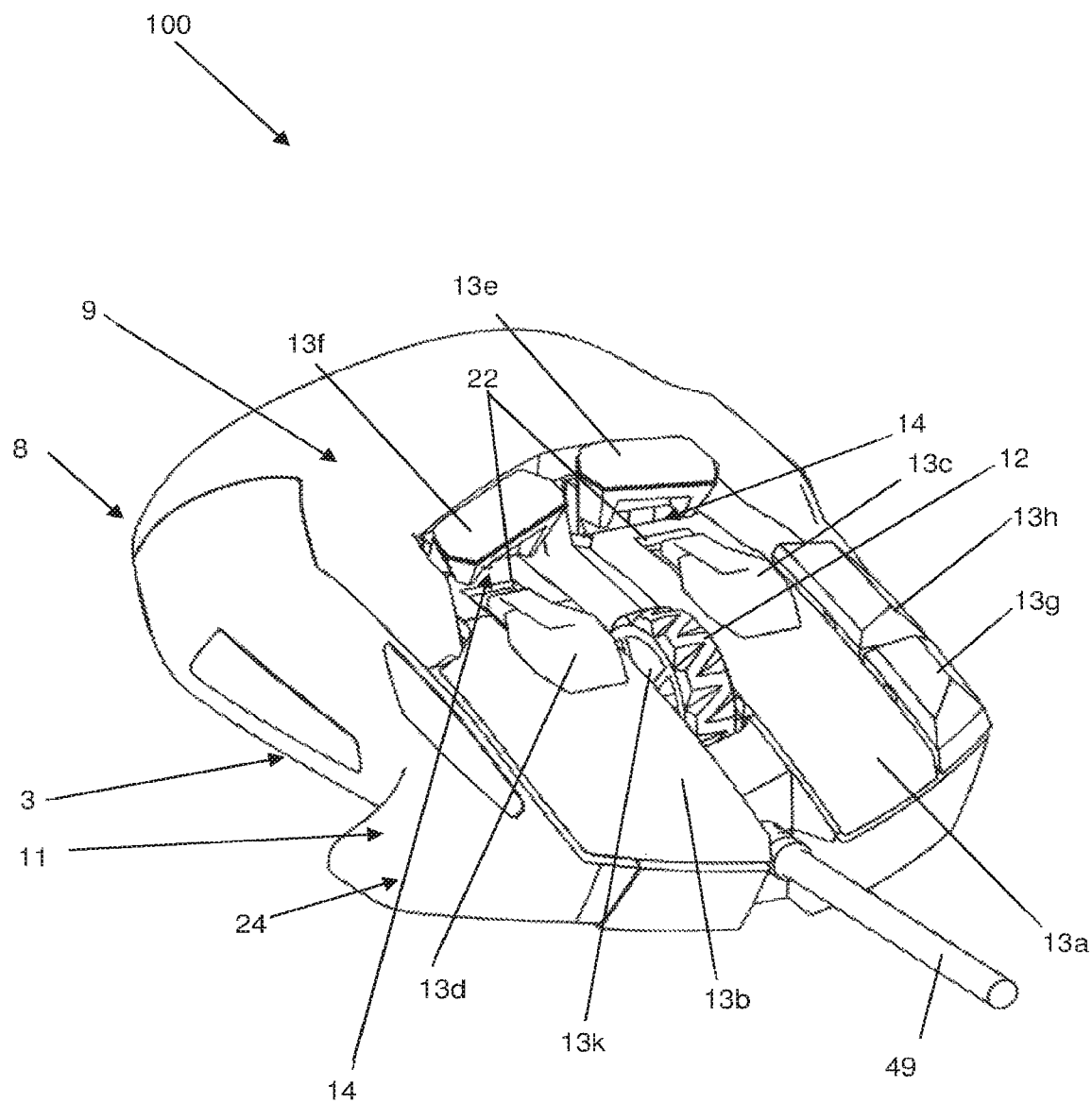
FIG. 18 shows an upper perspective view of another embodiment of the mouse.
Figure 19:
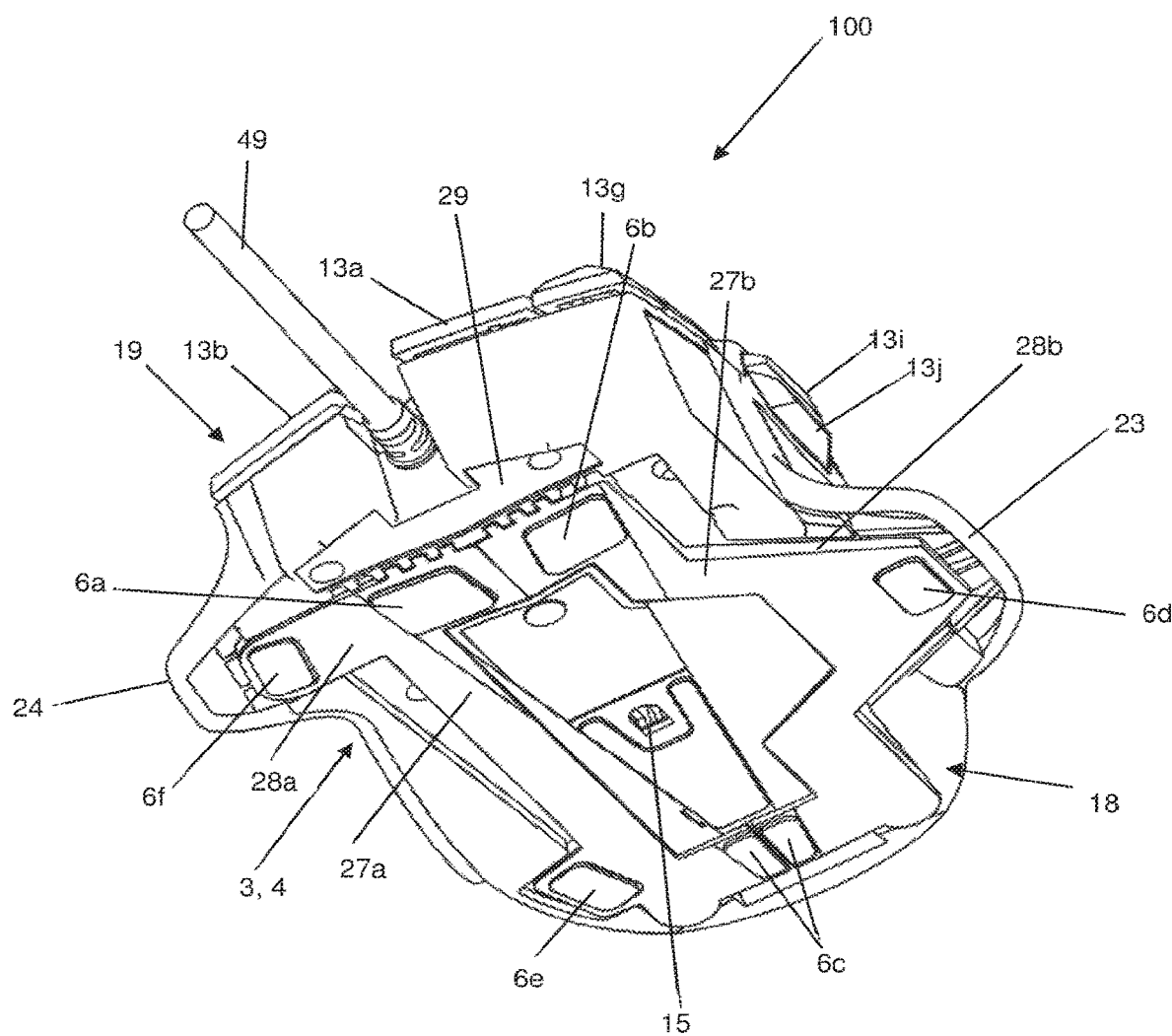
FIG. 19 shows a lower perspective view of the mouse of FIG. 18.

FIGS. 18-19 show another embodiment of the present invention in the form of mouse (100) that is generally similar to the mouse (1) and thus parts are referenced similarly. The mouse (100) differs in the shape of trigger buttons (13e, 13f) and fingertip buttons (13c, 13d) which use enlarged detachable button caps but otherwise function the same. As shown in FIG. 19, the mouse (100) has differently shaped linked feet assemblies (27a, 27b) and corresponding recesses (28a, 28b). FIGS. 18 and 19 also show a portion of mouse cable (49) for connecting the mouse to a USB port on the computer.

FIGS. 20a-20d show a detachable cradle contact foot (42) attached to the mouse (100). The cradle contact foot (42) includes a rectangular central portion (43) surrounded by an inclined arcuate surface (44). The edges of the central portion (43) define four pivot axes (45a-45d) that may operate in a similar manner to the pivot axes (25, 26) shown in FIG. 8 but allow a much greater deal of mouse rotation than pivot axes (25, 26).

Figure 21A:
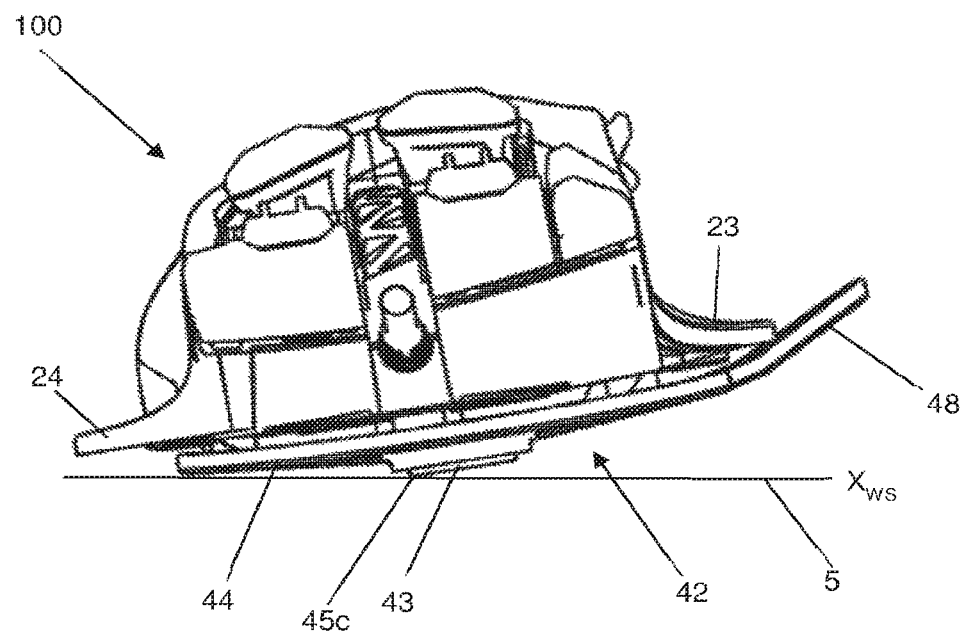
FIG. 21a shows a cradle contact foot attached to the mouse with the mouse tilting right.
Figure 21B:
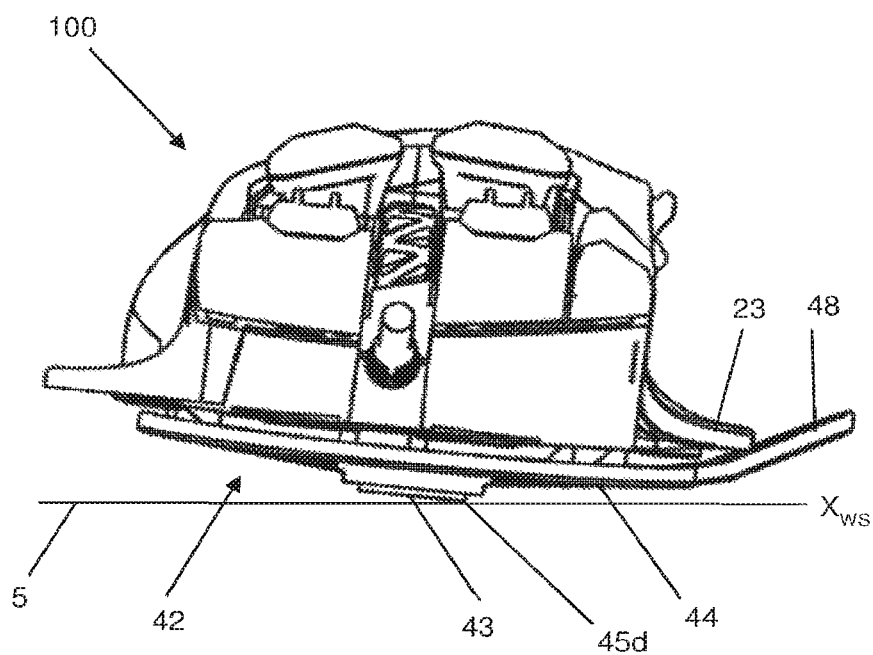
FIG. 21b shows the cradle contact foot attached to the mouse with the mouse tilting left.
Figure 21C:
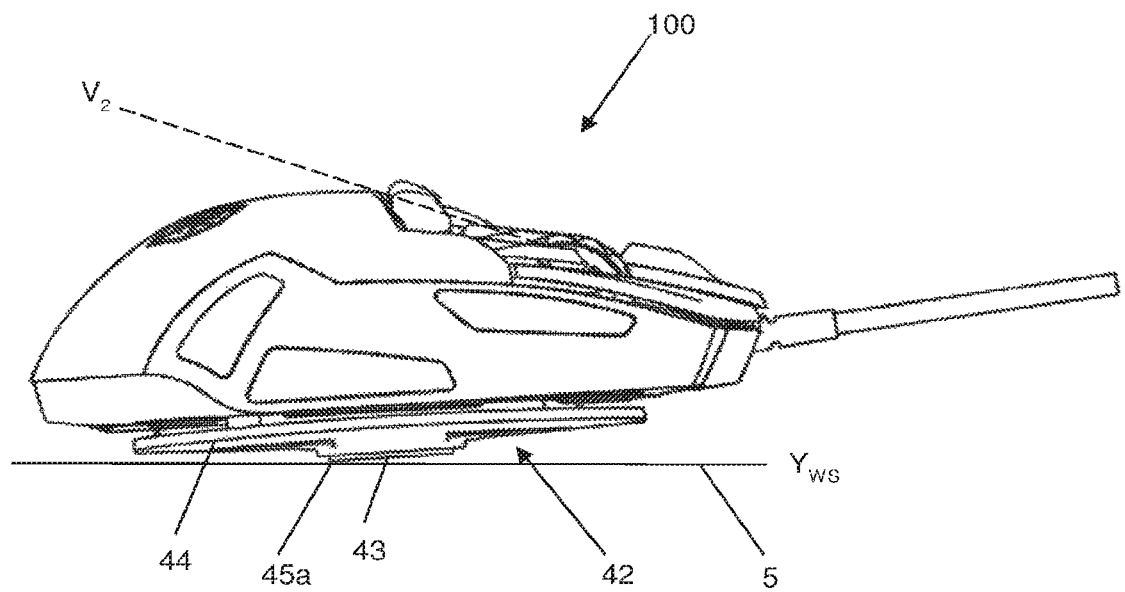
FIG. 21c shows the cradle contact foot attached to the mouse with the mouse tilting backward.
Figure 21D:
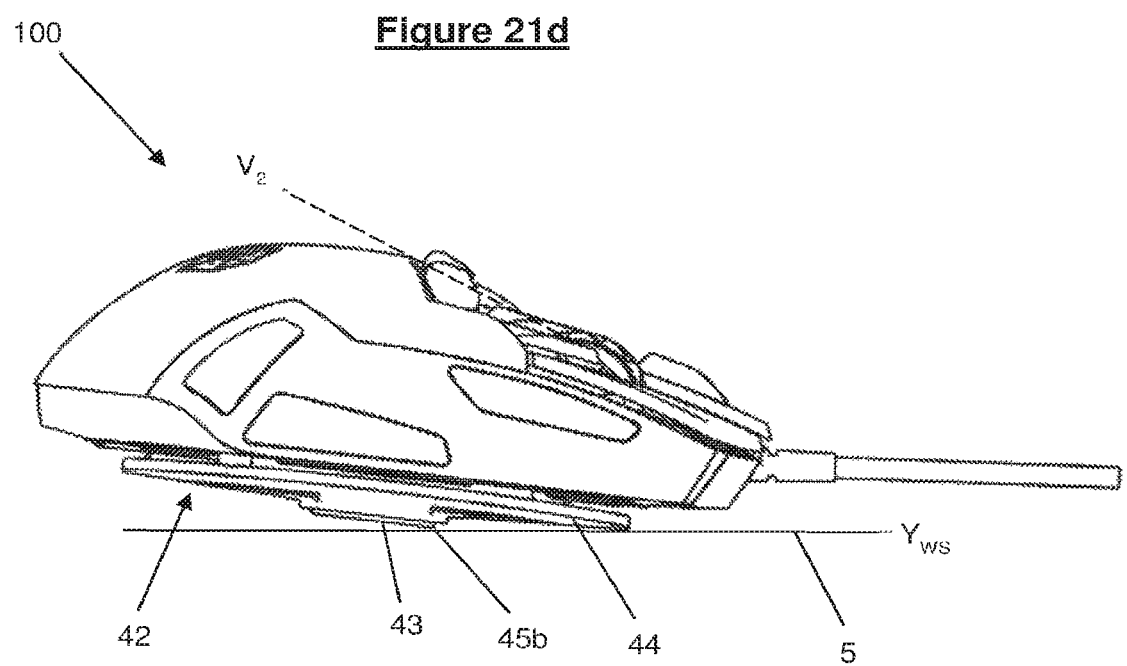
FIG. 21d shows the cradle contact foot attached to the mouse with the mouse tilting forward.

When the mouse (100) is attached to the cradle contact foot (42) it can be used to provide joystick axes commands to a computer application. Rotation about the pivot axes (45c, 45d) is respectively shown in FIGS. 21a and 21b and is interpreted as a roll input. Rotation about the pivot axes (45a, 45b), respectively shown in FIGS. 21a and 21b, is interpreted as a pitch input and rotation with respect to the $Z_M$ axis interpreted as a yaw input. Thus, the mouse (100) may quickly switch from mousing mode to joystick mode by attaching the cradle contact foot (42) to the mouse (100). The orientation sensor determines rotation by detecting rotation with respect to the $X_M$, $Y_M$, Z. The cradle contact foot is particularly useful in playing games that switch between a character movement mode to a vehicle movement mode as the user may quickly attach the cradle contact foot (42) and operate in an analogous way to a joystick without requiring shifting hands to a separate joystick.

Figure 23:
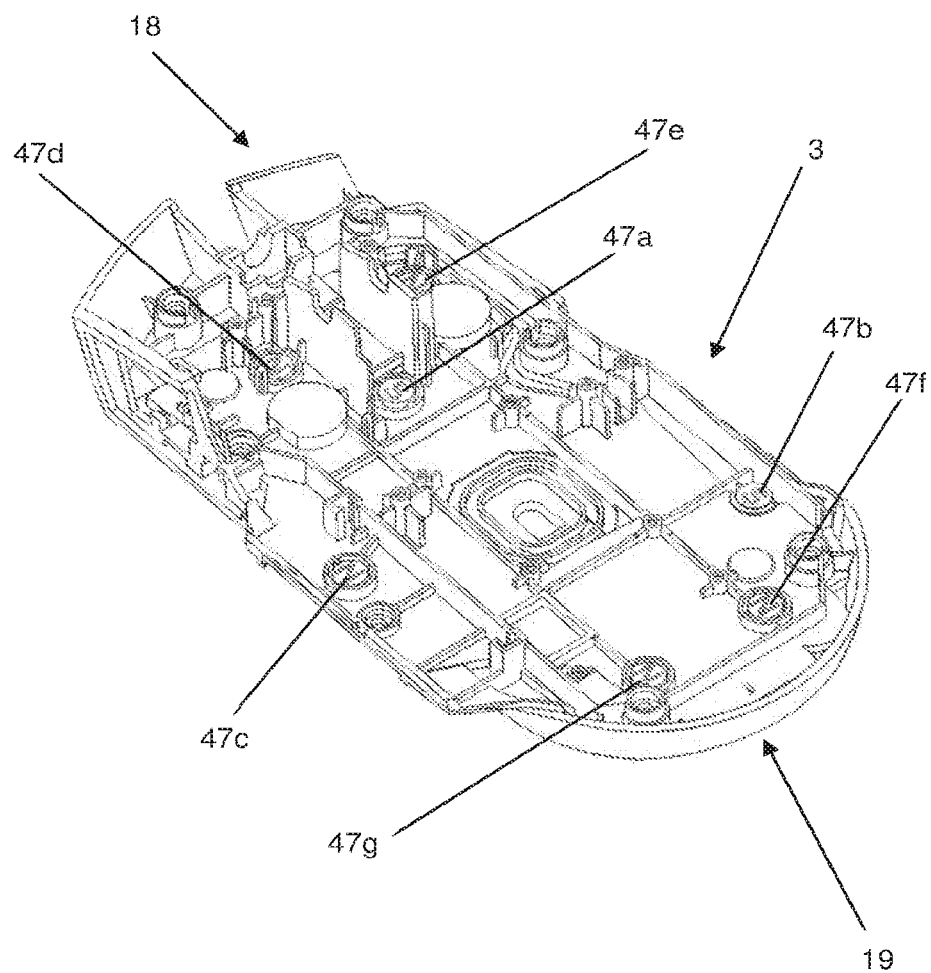
FIG. 23 shows an example of a graphical user interface of configuration software according to one embodiment for configuring a mouse driver.

To enable the quick attachment and detachment of the cradle contact foot (42) the cradle contact foot (42) is magnetically coupled to the mouse via three pairs of magnets (46a/47a, 46b/47b and 46c/47c), a magnet (46a, 46b, 46c) of each pair located in the foot (42) and the other magnet (47a, 47b, 47c) of each pair located in the mouse (1) in the positions shown in FIG. 23.

One pair of magnets (46c/47c) is arranged with opposite polarity to the other two pairs (46a/47a, 46b/47b) which ensures that the cradle contact foot (42) cannot be attached in the wrong orientation as the incorrectly positioned magnets will repel each other.

The cradle contact foot (42) includes a quick detach thumb extension (48) that extends past the lateral thumb extension (23) of the mouse (100) when attached. This quick detach extension (48) allows a user to push the cradle contact foot (42) laterally with respect to the mouse (100) and thereby detach the cradle contact foot (42). To attach the cradle contact foot (42) the user need only lift the mouse (100) and move over the cradle contact foot (42) close enough such that the magnetic force of each magnet pair (46a/47a, 46b/47b and 46c/47c) is sufficient to couple the foot (42) to the mouse (100).

Figure 22A:
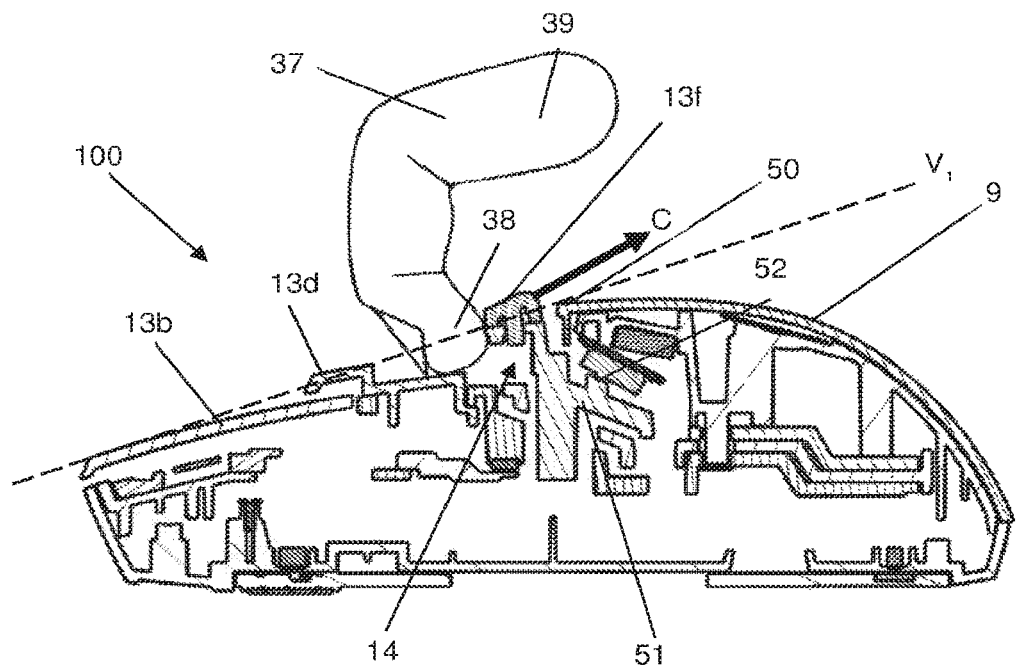
FIG. 22a shows a longitudinal cross-section of mouse with a finger pulling on a trigger button.
Figure 22B:
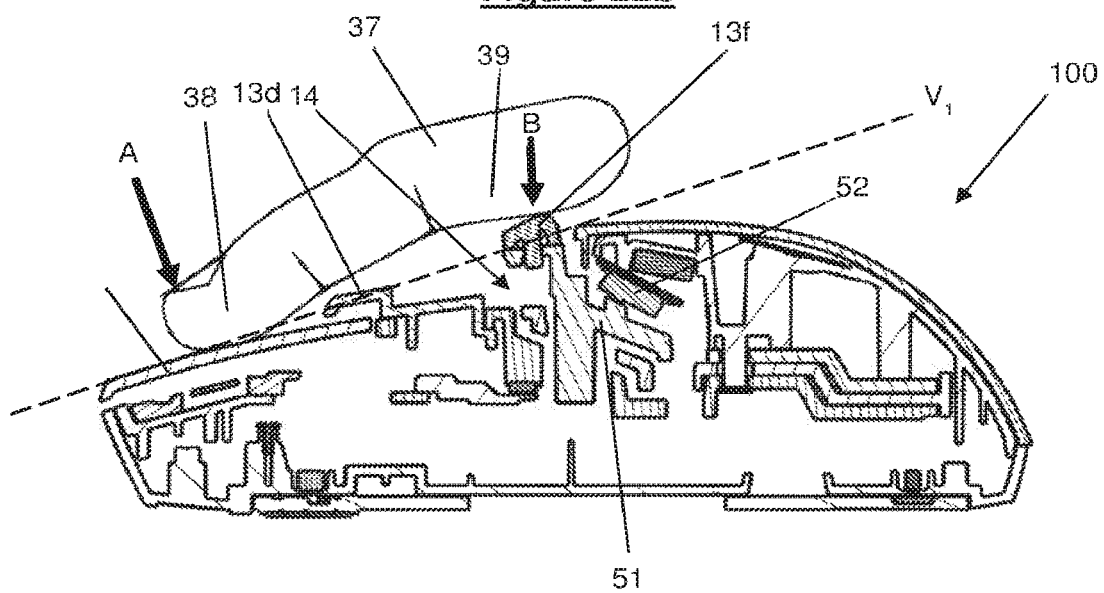
FIG. 22b shows a longitudinal cross-section of mouse with a finger pushing on the trigger button.

FIGS. 22a and 22b show a longitudinal cross-section through the mouse with a finger (37) superimposed over one of the primary buttons (13b) and trigger buttons (13f). FIG. 22a shows the finger (37) curled to pull the trigger button (13f) backward and upwards while FIG. 22b shows how the fingertip (38) may be used to press on the primary button (13b) while the corresponding trigger button (13f) is simultaneously pressed by the proximal phalange (39) of the finger (37).

Arrows (A, B and C) are examples of the approximate movement directions of the buttons (13b, 13f) as a result of the finger (37) pressing on them. Arrows A and B both have a negative $Z_M$ component as the fingertip (38) and proximal phalange (39) are respectively pressed against the primary button (13b) and trigger button (13f) while Arrow C represents the resultant button movement of the trigger button (13f) as the finger is curled such that the fingertip (38) engages with the opposite side of trigger button (13f) to the proximal phalange (39) as is shown in FIG. 22b, thus pushing the button (13f) upwards and backwards with a partial $Z_M$ component.

As with the mouse (1) recesses (14) are formed underneath the trigger buttons (13e,13f) and at least partially formed by the undersides of the trigger buttons (13e, 13f). Each recess (14) is located below, with respect to the $Z_M$ axis, a virtual reference line ($V_1$) drawn from the forward edge of the palm rest (9) to the primary buttons (13a, 13b). Portions of each trigger button (13e, 13f) extend above the virtual reference line ($V_1$). The recesses (14) are also located below a second virtual reference line ($V_2$) drawn from the forward-most portion of the palm rest (9) to the scroll wheel (12).

The trigger button (13f) is composed of a detachable cap attached to a lever arm (51) that contacts a three-state linear button (52). At rest, the button (52) is depressed to a neutral/inactive state. As the button (13f) is moved downwards it pivots downwards and forwards moving lever away from button (52) to a first state and a rearward and upward movement of button (13f) results in depressing the button (52) to a second state.

FIG. 23 shows the base (3) of the mouse (100) without the upper body (8) or internal componentry. Magnets (47a-47g) are positioned in the mouse base (3) for magnetically coupling the cradle contact foot (42) and linked feet assemblies (27a, 27b) to the mouse (100).

Figure 25:
FIG. 25 shows another example of a graphical user interface of configuration software according to one embodiment for configuring a mouse driver.

FIG. 24 and FIG. 25 show two graphically-depicted examples of a graphical user interface (GIU) software for configuration of the mouse driver, controlling applications on the computer dependent on mouse user control inputs.

FIG. 24 shows an example of assigning functions in a "configuration mode" where the mouse driver is configured to enter the mode on a state-change of a first user control being the orientation sensor. The mode is activated when the mouse is tilted to the right by 25 degrees.

Subsequent inputs are shown indented within a smaller box (preferably shaded differently) that are conditional on the 25-degree right hand tilt, including:

a second user control state change in the form of left trigger button (13e) pull which commands the OLED display to cycle through various options;

a third user control state change in the form of scroll wheel inputs which trigger DPI resolution changes of the mouse;

a fourth user control state change in the form of a negative rotation (i.e. pitch up) with respect to a $X_M$ axis such that the rear edge of the mouse pressed against the work surface, commanding the driver software to load the next profile;

a fifth user control state change in the form of a positive rotation (i.e. pitch down) with respect to a $X_M$ axis such that the front edge of the mouse pressed against the work surface, commanding the driver software to load the previous profile;

The 'configure mode' is exited when a state-change of the mouse orientation to the range −8 to +8 degrees is detected.

FIG. 25 shows an example of the mouse driver configuration for changing inputs to the computer in a 'media input mode'. The first level state-change is in an orientation sensor user control, the mouse transmitting a first data signal indicating a tilt of 1 degree which triggers a display of 'Media Mode' on the mouse display.

The second level includes a number of input changes to the other user-controls conditional on the first level user control state, these include:
  configuring the scroll wheel inputs to be interpreted as volume up/down inputs
  left-click press is configured to change media track to previous
  middle-click is configured to toggle mute
  right-click press is configured to do nothing but represents a conditional change in state under which a further user control is configured. The further user control is the pressure sensor in the right click button that provides a switch to first track input when the state is detected as a force press of greater than 55% and also blocks any inputs provided by a right-click release state-change when in that 'greater than 55%' state.
  right-click press is configured to change media track to next The 'media mode' is exited when a state-change of the first user control is detected, i.e. when the mouse is not tilted.

The various user controls and state-changes that provide configurable options are displayed in a hierarchical view with conditional user control configurations displayed at an indented position to their parent user control state on which they are conditional.

Thus, any number of tiered controls may be setup such that a much greater number of possible inputs may be made to the computer than conventional single non-conditional user controls. Prior art mouse driver software may only provide a single possible configuration as a result of a user control state change, e.g. a button click may be re-assigned to a keystroke. In contrast, the mouse driver software shown in FIGS. 18 and 19 enables the user to provide additional configurable inputs to the computer dependent on the state of user controls.

Prior art mouse driver software may only enable a single configurable state-change, e.g. mouse left-click in contrast to the mouse disclosed in which each user-control has multiple 'states', including buttons, which have 'press' and 'release' states. This multi-state user control configuration method enables the user to configure other user controls (e.g. other buttons) to perform different functions dependent on the state of the first user control.

Aspects of the present invention have been described by way of example only and it should be appreciated that modifications and additions may be made thereto without departing from the scope thereof.

The invention claimed is:

1. A mouse for use with a computer, the mouse including:
  a base with a lower surface configured for sliding across a work surface, the lower surface having a first base contact footprint for supporting the mouse on the work surface, the first base contact footprint including one or more contact feet lying in a first base contact plane, the mouse being in a first orientation when the first base contact plane is parallel to the work surface;
  an upper body, extending from the base;
  at least one contact sensor located on the upper body, the contact sensor activated by a contact or force applied in a direction at least partially toward the first base contact plane;
  a movement sensor system, capable of detecting mouse movement relative to the work surface, the movement sensor system including an optical movement sensor and generating a movement data signal capable of being processed by the computer to determine mouse movement;
  a communication system, for communicating with the computer,
  wherein a frame of reference for the mouse is defined by:
    two mutually orthogonal axes; hereinafter $X_{WS}$ and $Y_{WS}$ axis, defining a plane including the work surface, upon which the mouse is operated by a user's hand, the $X_{WS}$ and $Y_{WS}$ axes being respectively orientated anteriorly and laterally to the user;
    a third work surface axis hereinafter $Z_{WS}$ orientated mutually orthogonal to both the $X_{WS}$ and $Y_{WS}$ axes;
    $X_{WS}$ and $Y_{WS}$ axes work surface movements by the mouse as detected by the movement sensor system correlate to $X_S$ and $Y_S$ axis on-screen pointer movements on the computer;
    a lateral mouse axis $X_M$ and longitudinal mouse axis $Y_M$ corresponding to the on-screen $X_S$ and $Y_S$ axes respectively;
    a third mouse axis, hereinafter the $Z_M$ axis, is orientated mutually orthogonal to both the $X_M$ and $Y_M$ axes; and wherein:
    the "rear" of the mouse is the portion closest to the user's wrist in use;
    the "forward" part of the mouse is closest to the user's fingertips at the opposing side of the mouse to the "rear";
    the $Y_M$ axis extends in a longitudinal direction between the "front" and "rear" of the mouse;
    the mouse $Z_M$ axis is orientated vertically, perpendicular to a horizontal work surface when the mouse is positioned with a lower portion resting on the work surface;
  wherein the upper body includes:
    a palm rest extending from the rear of the mouse upper,
    at least one trigger button, forward of the palm-rest and
    at least two primary buttons, forward of the at least one trigger button, a recess formed:
      underneath the at least one trigger button, and
      at least partially formed by the underside of the at least one trigger button, and
  wherein the at least one trigger button extends forward from a forward edge of the palm-rest.

2. A mouse as claimed in claim 1, wherein the recess is located below, with respect to the $Z_M$ axis, a virtual reference line drawn from the forward-most portion of the palm rest and the primary buttons, the at least one trigger button having at least a portion extending above the virtual reference line.

3. A mouse as claimed in claim 2, wherein the virtual reference line is drawn from the forward-most portion of the palm rest and forward-most portions of the primary buttons.

4. A mouse as claimed in claim 2, wherein the virtual reference line is drawn from the forward-most portion of the palm rest to a scroll wheel.

5. A mouse as claimed in claim 1, wherein the at least one trigger button includes a bidirectional button, wherein the communication system provides a:

first input signal to the computer when the bidirectional button is moved in a first direction, and second input signal to the computer when the bidirectional button is moved in a second direction, wherein both the first and second directions have a $Z_M$ component.

6. A mouse as claimed in claim 1, wherein at least a portion of the upper body is shaped with an upper surface having a contour extending longitudinally forward from the mouse rear through a step, discontinuity, overhang, drop, point of inflection or other vertical height change to the forward portion of the mouse.

7. A mouse as claimed in any one of the preceding claims, wherein the at least one trigger button and at least one primary button are respectively both simultaneously operable by pressing a proximal phalange and a fingertip of a single common finger.

8. A mouse as claimed in claim 1, including a display screen, the display screen configured to display information indicative of the data signals generated by at least one of the following:
a mode sensor;
a force transducer;
the optical sensor;
an orientation sensor;
an accelerometer.

9. A mouse as claimed in claim 1, configured to provide three-dimensional movement data, the mouse including at least one orientation sensor capable of detecting the orientation of the computer mouse and outputting data indicative of the orientation, the communication system transmitting a data signal to the computer indicating the orientation of the computer mouse, the orientation sensor providing movement data indicative of movement of the mouse in at least a third dimension, the third dimension including rotation about an axis.

10. A mouse as claimed in claim 9, configured to provide at least eight-dimensional movement data, including three axes of acceleration, three axes of rotation and two axes of translation.

11. A mouse as claimed in claim 9, wherein at least one contact foot is configured to act as a pivot axis, about which the mouse may rotate, wherein the position of the contact foot is laterally adjustable to adjust the position of the pivot axis relative to a longitudinal $Y_{MC}$ axis and wherein the base contact footprint includes multiple spaced-apart contact feet, at least two of the feet configured to act as the pivot axis and the mouse includes two pivot axes, a pivot axis provided on each side of the central longitudinal $Y_{MC}$ axis, the at least two pivot axes being mutually divergent and extending forward from the rear of the mouse on opposing sides of the central longitudinal $Y_{MC}$ axis of the mouse and wherein the first base contact footprint is reconfigurable to alter the angle of divergence between the two pivot axes.

12. A mouse as claimed in claim 11, wherein the mouse includes a second base contact footprint, each base contact footprint including at least one corresponding contact foot, forming respective base contact planes and including a common pivot axis at the boundary between the first and second base contact footprints.

13. A mouse as claimed in claim 11, wherein the first base contact footprint includes at least two linked feet assemblies, laterally adjustable to increase the separation of the contact feet in the first base contact footprint, wherein the linked feet assemblies each include one or more of the contact feet and also include at least one lateral foot and wherein the linked feet assemblies each include one or more of the contact feet and also include at least one lateral foot.

14. A mouse as claimed in claim 13, wherein the mouse includes a detachable cradle contact foot with multiple pivot axes, the mouse and cradle contact foot rotatable together about the pivot axes.

15. A computer mouse as claimed in claim 9, wherein the computer is configured to provide at least one command to an application when the orientation sensor data relating to at least one axis passes at least one predetermined threshold value, and wherein the computer is configured to provide a variable input to a computer application, the variable input related to the orientation sensor data corresponding to at least one axis.

16. A computer mouse as claimed in claim 9, wherein the orientation sensor provides mouse rotation data indicative of the mouse rotation about $X_M$, $Y_M$ and $Z_M$ axes, the computer configured to respectively provide corresponding pitch, roll and yaw commands to a computer application.

17. A computer mouse as claimed in claim 16, wherein at least one of the buttons includes a force transducer capable of outputting a data signal indicative of the force applied to the button.

18. A computer mouse as claimed in claim 17, wherein the computer is configured to provide at least one command to a computer application when the force sensor data indicates the force passes a predetermined threshold force value.

19. A computer mouse as claimed in claim 18, wherein the threshold force value is automatically altered if the orientation sensor data passes at least one predetermined threshold orientation value.

* * * * *